US012548206B2

(12) United States Patent
Marsden et al.

(10) Patent No.: US 12,548,206 B2
(45) Date of Patent: Feb. 10, 2026

(54) MIXED-REALITY BEACONS

(71) Applicant: Lyv Technologies Inc., Milpitas, CA (US)

(72) Inventors: Randal Jay Marsden, Milpitas, CA (US); Colten Randal Marsden, Mesa, AZ (US); Talon Blake Marsden, Milpitas, CA (US); Catharin Walker Eure, Mission Viejo, CA (US)

(73) Assignee: Lyv Technologies Inc., Gilbert, AZ (US)

( * ) Notice: Subject to any disclaimer, the term of this patent is extended or adjusted under 35 U.S.C. 154(b) by 176 days.

(21) Appl. No.: 18/136,331

(22) Filed: Apr. 18, 2023

(65) Prior Publication Data

US 2023/0334725 A1    Oct. 19, 2023

Related U.S. Application Data

(60) Provisional application No. 63/331,962, filed on Apr. 18, 2022.

(51) Int. Cl.
*G06T 11/00* (2006.01)
*G01C 21/36* (2006.01)
(Continued)

(52) U.S. Cl.
CPC .......... *G06T 11/00* (2013.01); *G01C 21/3679* (2013.01); *H04N 23/64* (2023.01); *H04W 4/024* (2018.02)

(58) Field of Classification Search
CPC .... G06T 11/00; G01C 21/3679; H04N 23/64; H04W 4/024; H04W 4/02
See application file for complete search history.

(56) References Cited

U.S. PATENT DOCUMENTS 8,687,021 B2    4/2014    Bathiche et al.
8,821,272 B2    9/2014    Thomas et al.
(Continued)

FOREIGN PATENT DOCUMENTS

EP    2410715 A1    1/2012

OTHER PUBLICATIONS

International Search Report and Written Opinion of the International Searching Authority in International Application PCT/US2023/019008, Aug. 9, 2023, 10 pages.

*Primary Examiner* — Michael Le
(74) *Attorney, Agent, or Firm* — Charles Shemwell

(57) ABSTRACT

A cloud compute engine applies geo-location information received from a mobile computing device to identify, within a database of geo-location markers, a bundle of geo-location markers corresponding to points of potential user interest within a prescribed proximity to the mobile device, transmitting the geo-location markers to the mobile device to be rendered in real time, on a display of the mobile device, as mixed-reality "beacons" overlaid on an image of an objective scene and anchored to geo-positioning coordinates of places/objects within the objective scene. As a user moves/reorients the mobile device, beacons corresponding to points of interest within the field of view appear in the mixed-reality display at locations corresponding to physical locations of the points of interest within the objective scene, enabling the user to identify, within the physical world, locations and other information regarding places/objects/persons of interest based on overlay-locations of the beacons within the mobile-device display.

28 Claims, 9 Drawing Sheets

Objective Scene – Reality

Rendered Scene with AR Beacon Overlay

(51) Int. Cl.
*H04N 23/60* (2023.01)
*H04W 4/024* (2018.01)

(56) References Cited

U.S. PATENT DOCUMENTS

| | | |
|---|---|---|
| 9,269,011 B1 | 2/2016 | Sikka et al. |
| 9,488,488 B2 | 11/2016 | Waldman |
| 10,593,086 B2 | 3/2020 | Tham |
| 10,706,624 B1* | 7/2020 | Chuah .................... H04N 23/64 |
| 10,769,438 B2 | 9/2020 | Bendale et al. |
| 11,195,342 B2 | 12/2021 | Stansell et al. |
| 11,302,082 B2 | 4/2022 | Martin |
| 12,141,344 B2 | 11/2024 | Benedetto |
| 12,229,897 B2 | 2/2025 | Singh |
| 2009/0081959 A1* | 3/2009 | Gyorfi .................... H04L 67/52 |
| | | 455/70 |
| 2010/0081416 A1 | 4/2010 | Cohen |
| 2010/0214111 A1* | 8/2010 | Schuler ................ H04W 4/021 |
| | | 340/686.1 |
| 2011/0313779 A1* | 12/2011 | Herzog ................ G06Q 30/02 |
| | | 715/744 |
| 2012/0015672 A1* | 1/2012 | Jung ..................... H04W 4/023 |
| | | 455/456.3 |
| 2013/0332066 A1* | 12/2013 | Jeung ..................... G01C 21/34 |
| | | 701/420 |
| 2016/0027177 A1* | 1/2016 | Hutchison ............. H04N 23/80 |
| | | 382/103 |
| 2016/0116292 A1* | 4/2016 | An ..................... G01C 21/3614 |
| | | 701/454 |
| 2017/0213387 A1 | 7/2017 | Bean et al. |
| 2017/0213393 A1* | 7/2017 | Fedosov ............ G01C 21/3638 |
| 2018/0103208 A1* | 4/2018 | Jung ..................... H04N 23/62 |
| 2018/0232921 A1 | 8/2018 | Smith et al. |
| 2019/0102922 A1* | 4/2019 | Gum .................. G01C 21/3667 |
| 2019/0191125 A1* | 6/2019 | Fink ........................ H04N 7/08 |
| 2020/0004328 A1 | 1/2020 | Blume et al. |
| 2020/0106965 A1* | 4/2020 | Malia .................. H04N 23/631 |
| 2021/0311971 A1* | 10/2021 | Karia .................... G06F 3/0488 |
| 2021/0390745 A1 | 12/2021 | Rykhliuk et al. |
| 2022/0397411 A1* | 12/2022 | Brown ................ G01C 21/3476 |
| 2023/0214082 A1* | 7/2023 | Kang ..................... G06F 3/011 |
| | | 345/633 |
| 2023/0410332 A1* | 12/2023 | Holzer ..................... G06T 7/97 |

* cited by examiner

FIG. 1
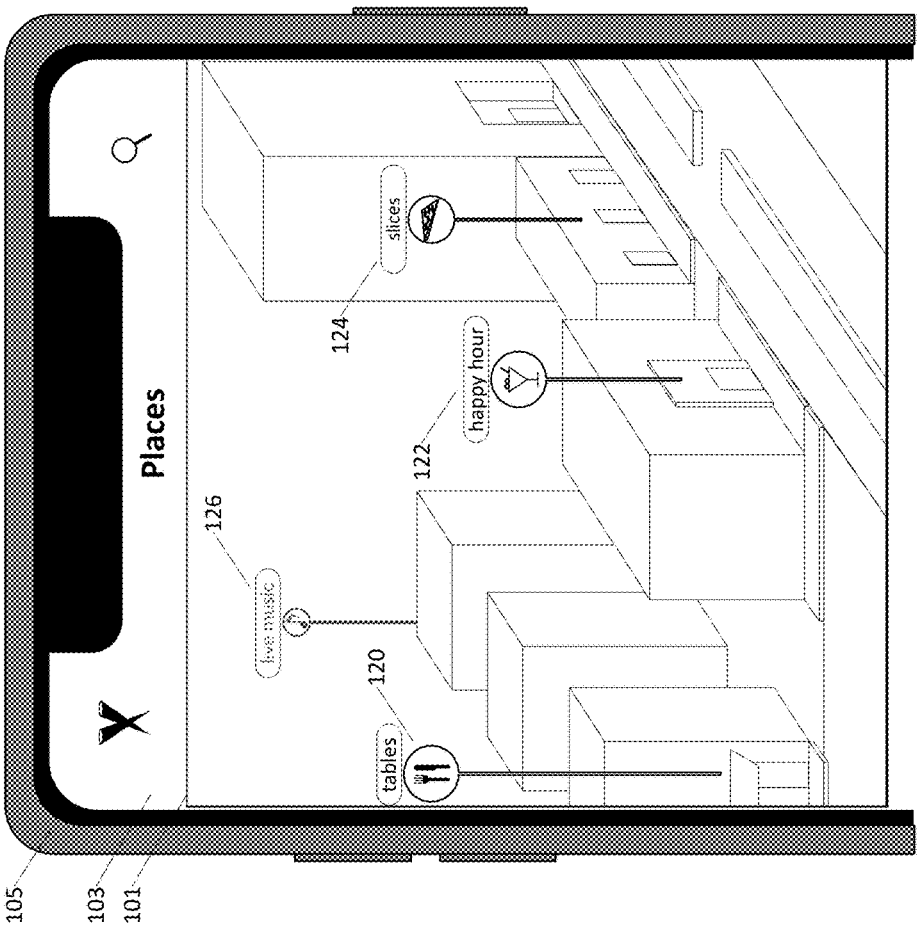
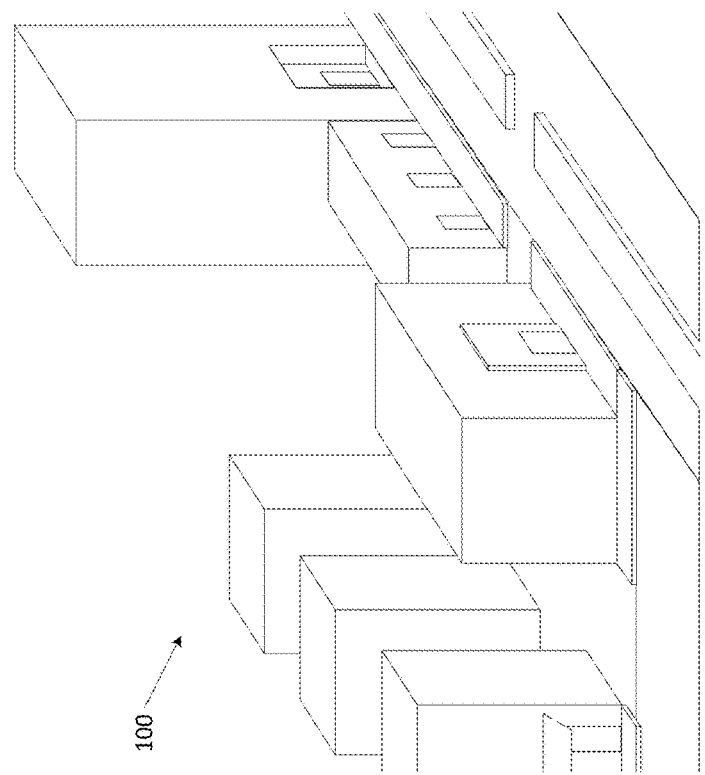

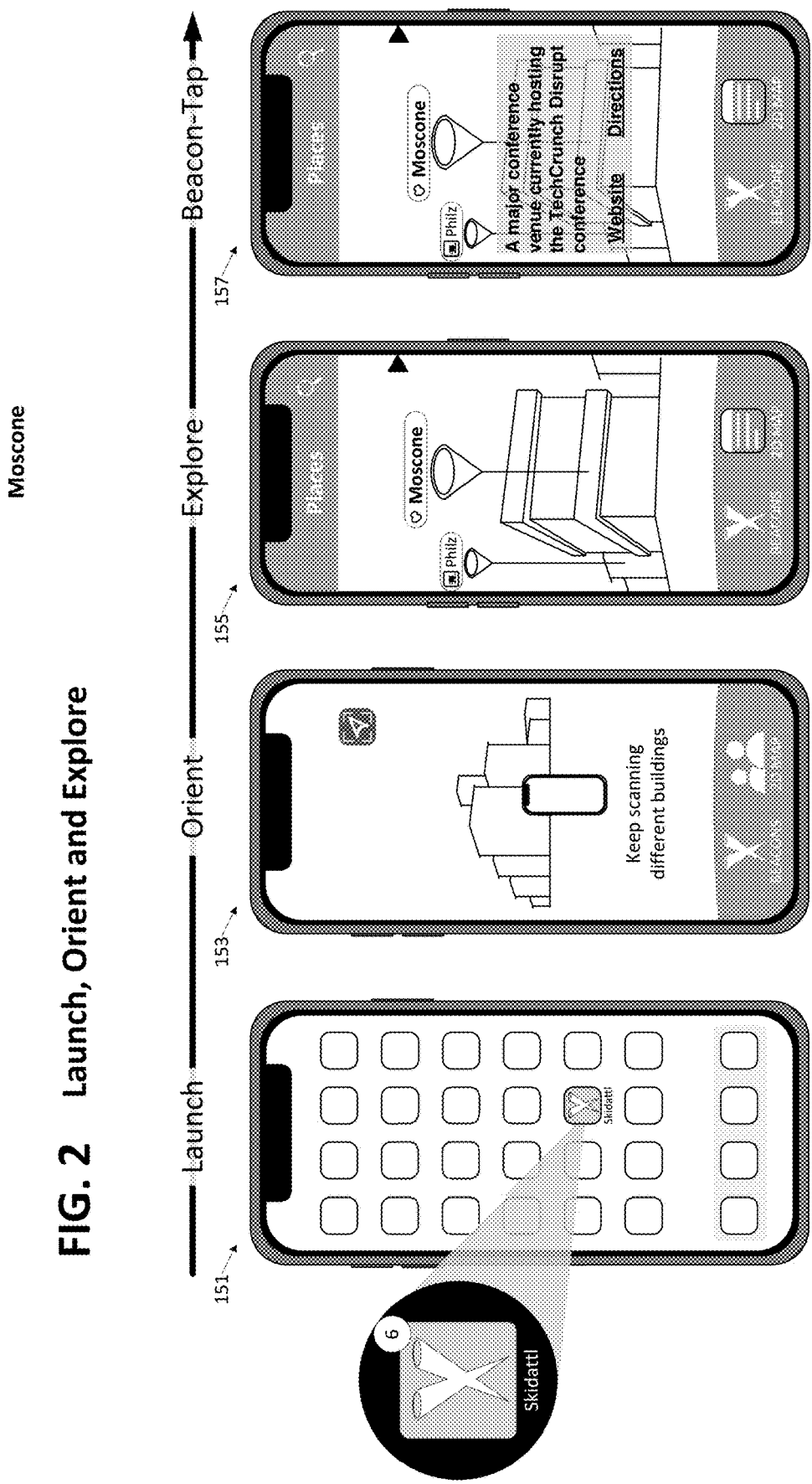
FIG. 2  Launch, Orient and Explore

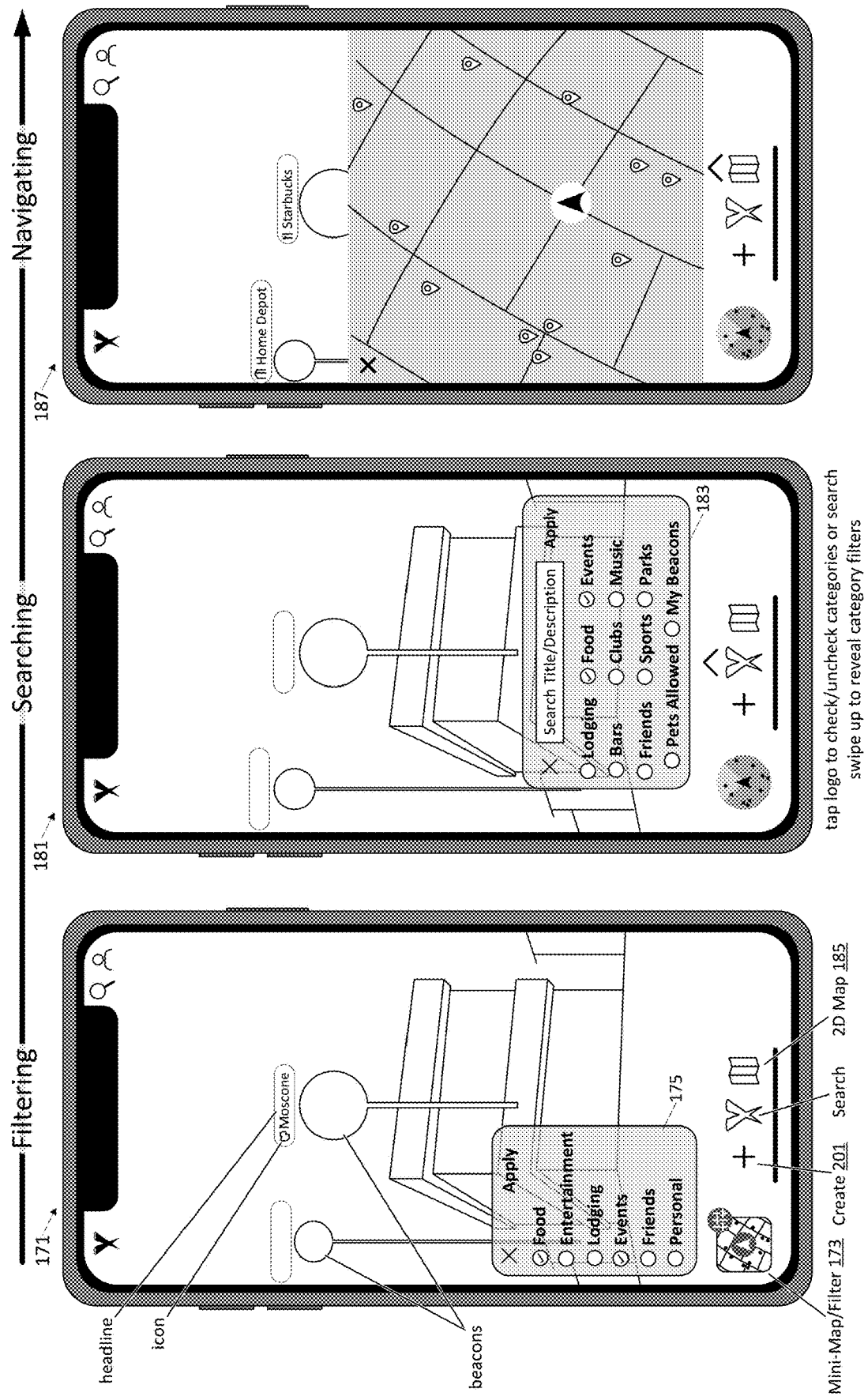

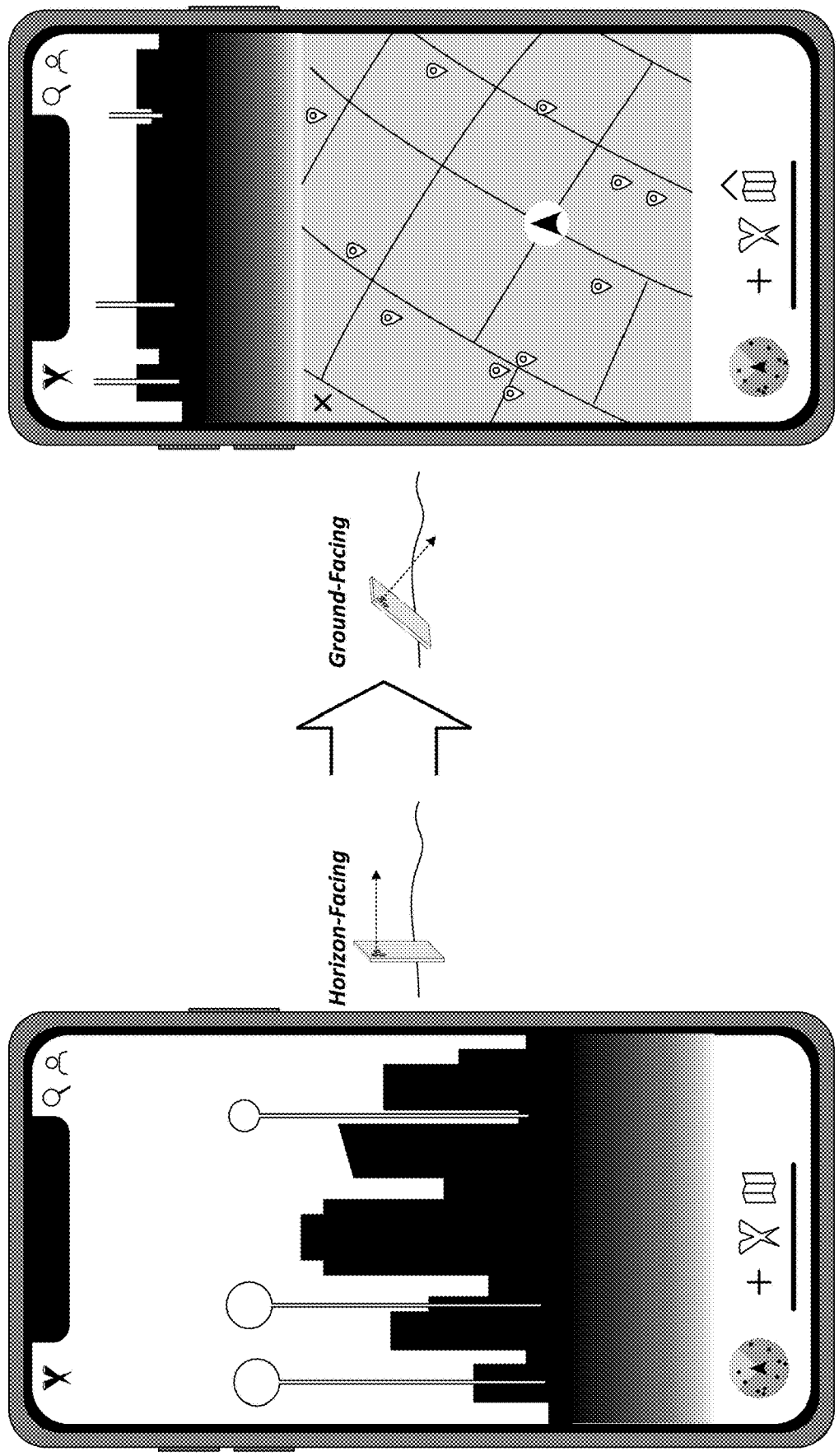
FIG. 4 Exploring cont'd

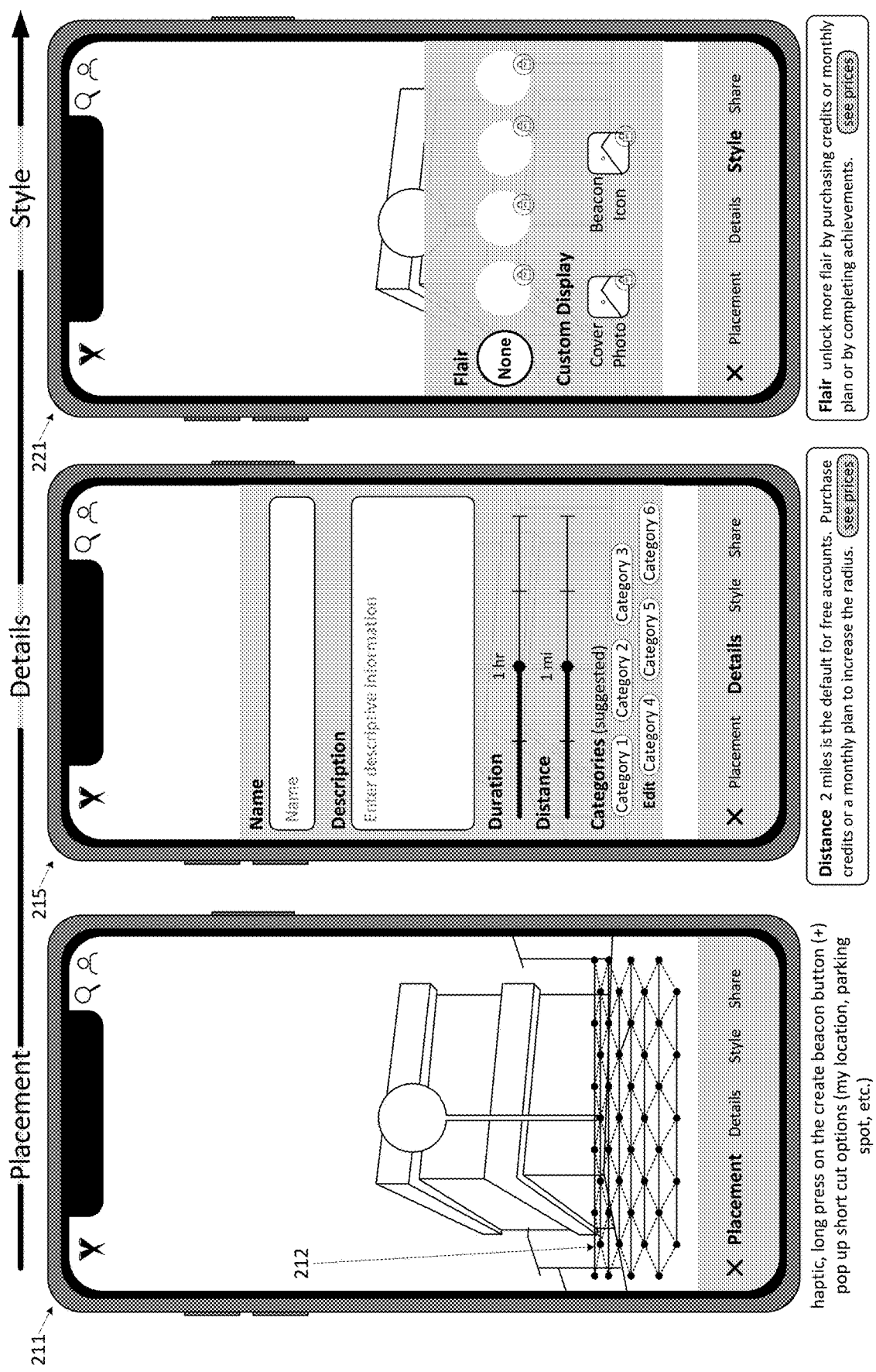
FIG. 5A Creating

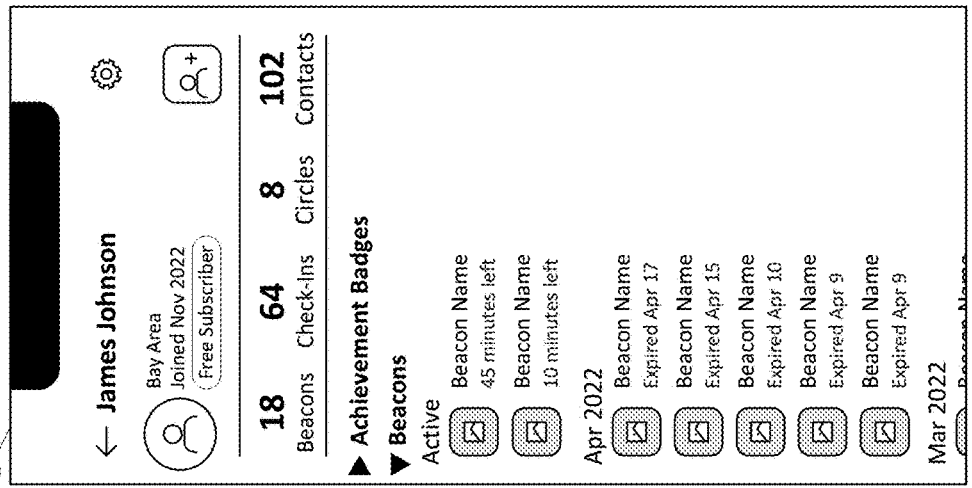
FIG. 6A Profile
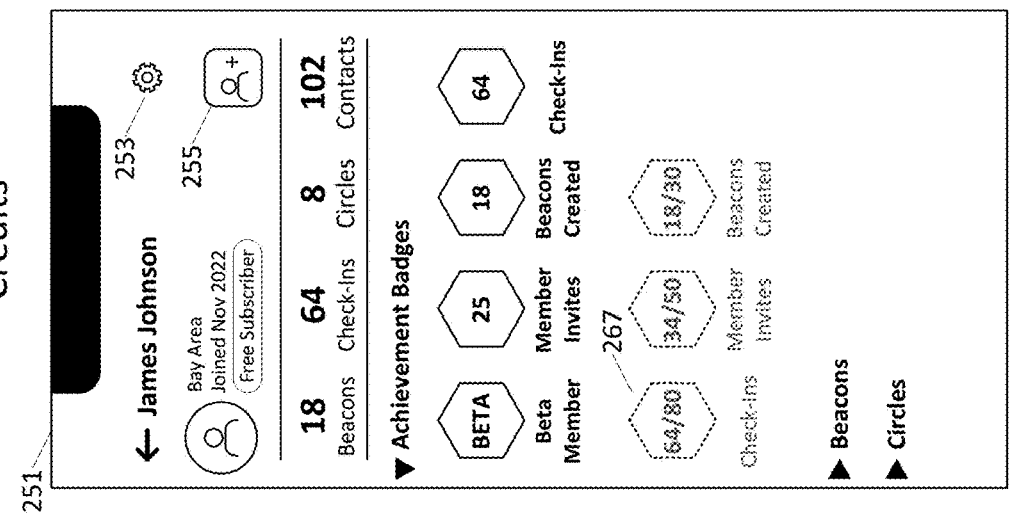
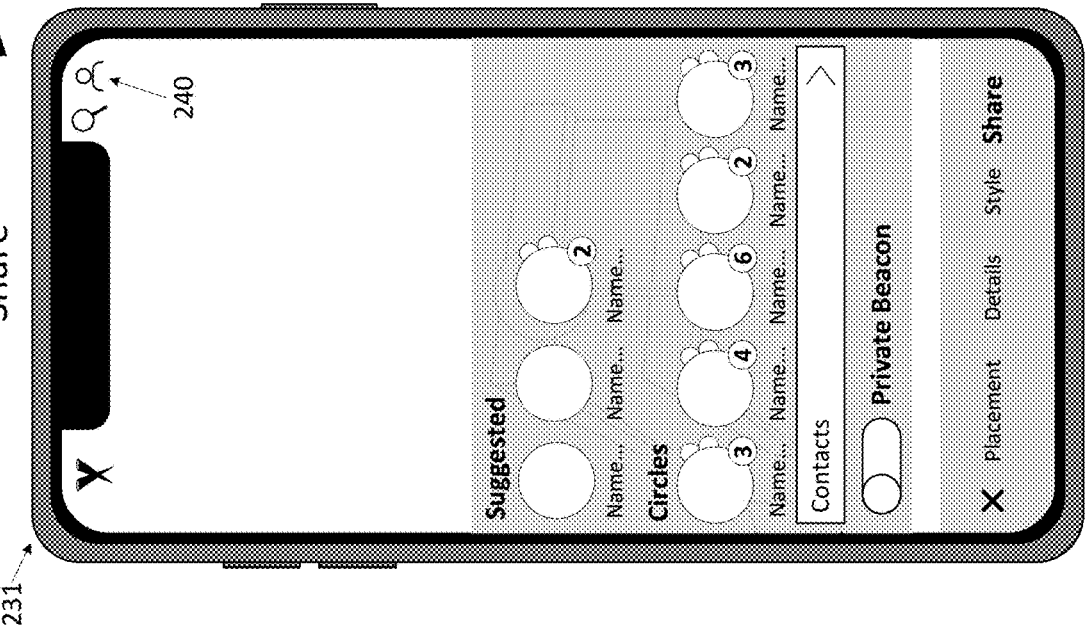
FIG. 5B Creating cont'd

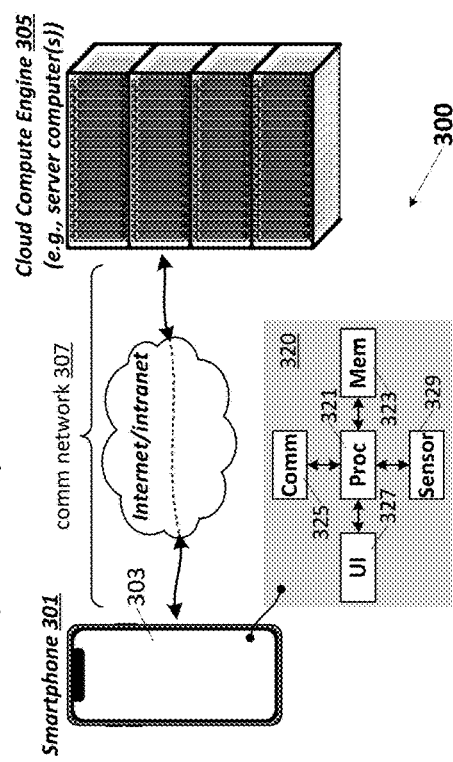
FIG. 7 System Architecture
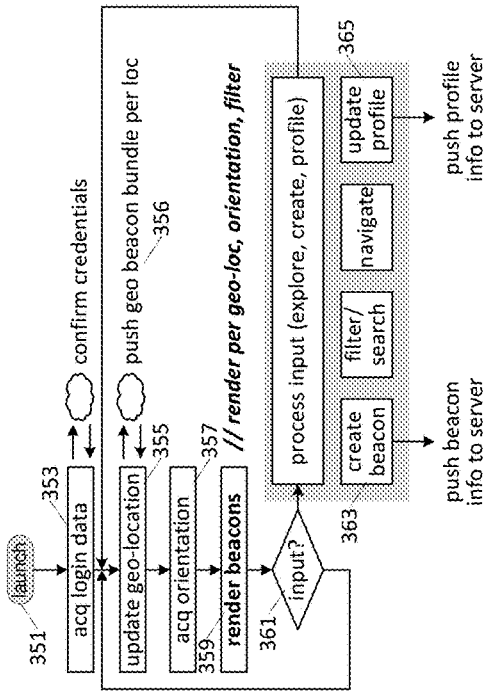
FIG. 8 Operational Flow
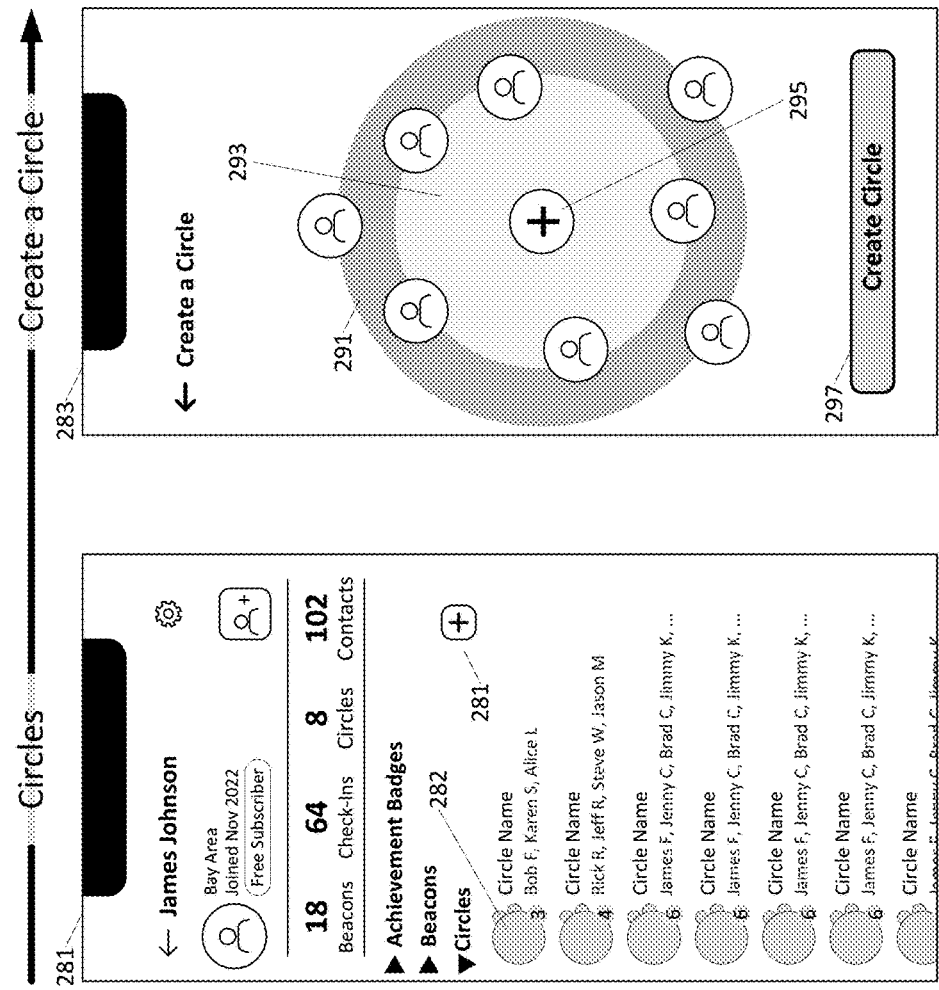
FIG. 6B Profile Cont'd

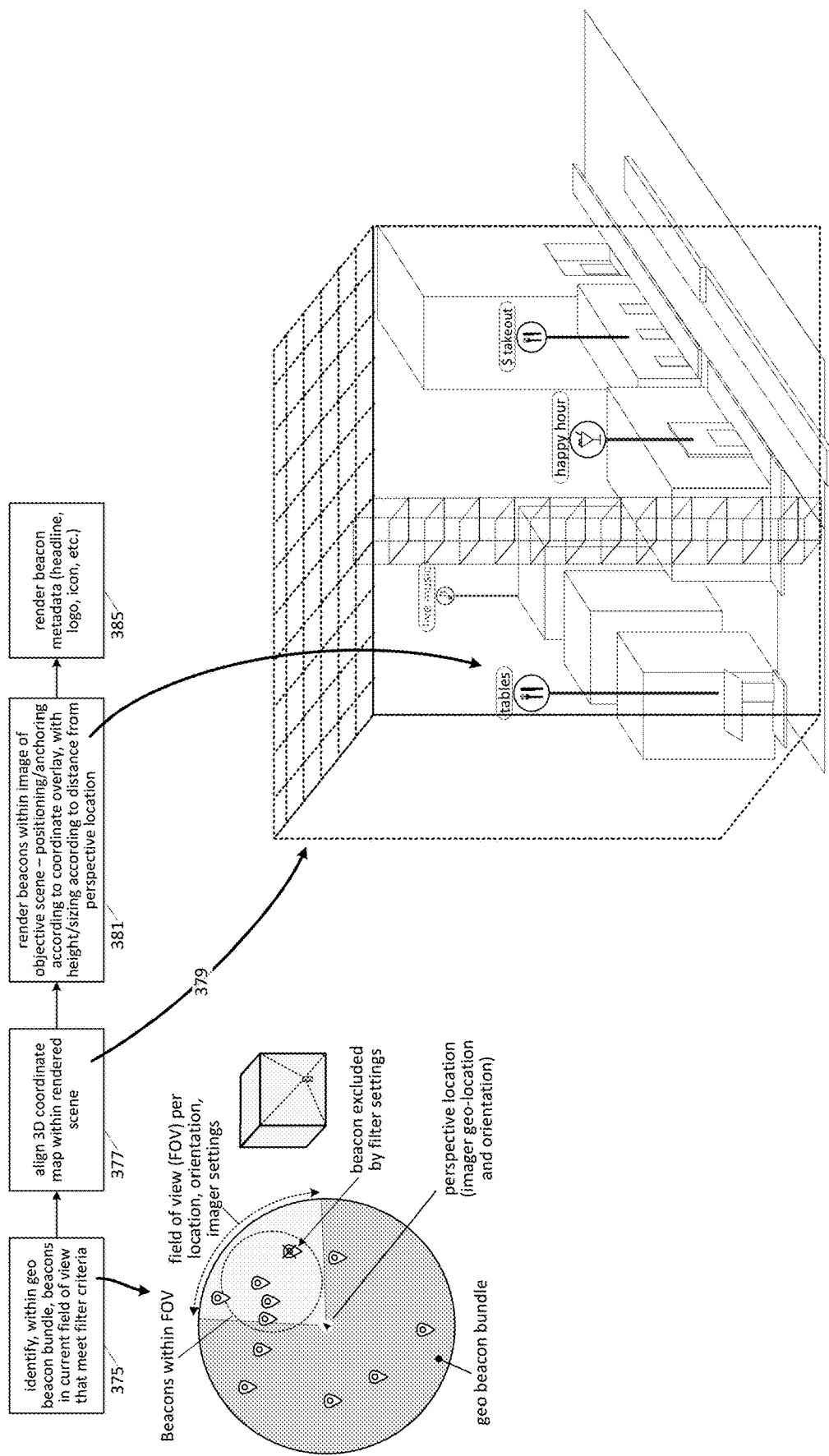
FIG. 9 Render Beacons

MIXED-REALITY BEACONS

CROSS-REFERENCE TO RELATED APPLICATIONS

This application hereby claims priority to and incorporates by reference U.S. Provisional Application No. 63/331,962 filed Apr. 18, 2022 and entitled "Proximity-Based Mixed-Reality Platform ("PROXDR")."

TECHNICAL FIELD

The disclosure herein relates to systems, system components and methods within a mixed-reality platform.

DRAWINGS

The various embodiments disclosed herein are illustrated by way of example, and not by way of limitation, in the figures of the accompanying drawings and in which like reference numerals refer to similar elements and in which:

FIG. 1 illustrates an objective scene as may be perceived by a human observer together with an image of the same scene captured rendered on a smartphone display with a mixed-reality beacon overlay;

FIG. 2 illustrates an exemplary smartphone user experience/interaction with an executing instance of a beacon software application ("beacon app");

FIG. 3 illustrates a number of the aforementioned beacon behaviors and characteristics, showing an exemplary categorical filtering feature;

FIG. 4 illustrates an exemplary auto-transition within the beacon app between 3D beacon view and 2D beacon-map view;

FIGS. 5A and 5B illustrate exemplary user prompts with the beacon app for creating/instantiating new beacons;

FIGS. 6A and 6B illustrate an exemplary set of user profile screens that may be displayed by the beacon app;

FIG. 7 illustrates additional detail with respect to a beacon rendering system showing, as an example, a user smartphone as the client-side mobile computing device having a display on which beacons will be rendered and its wireless and/or wired interconnection to a cloud compute engine;

FIG. 8 illustrates an exemplary beacon-app execution flow implemented within the mobile compute device shown in FIG. 7 and other embodiments above;

Figure 10:
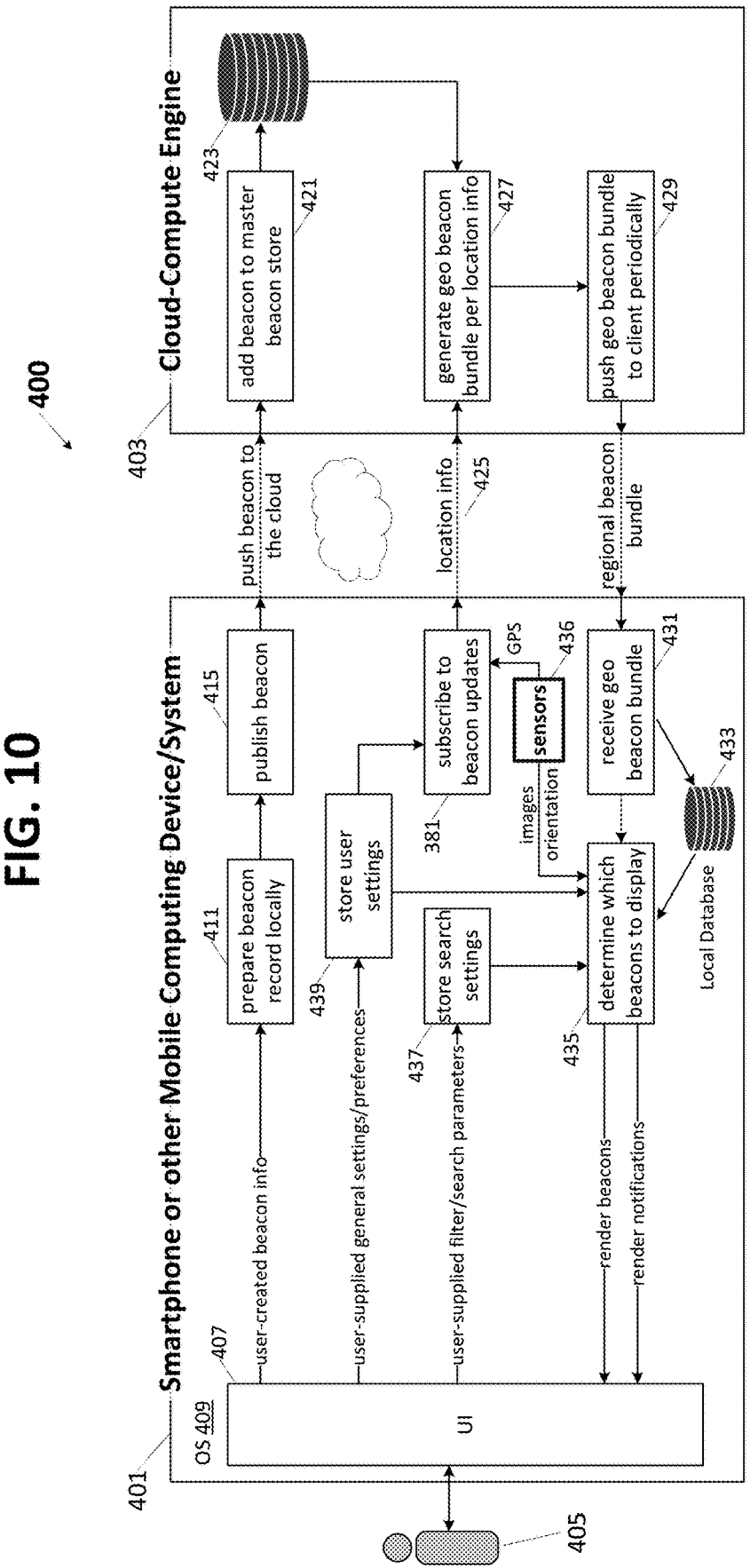

FIG. 9 illustrates a more detailed set of actions executed by a rendering engine (implemented by beacon-app program code execution) to render beacons within a displayed scene (i.e., digitized image of an objective scene); and FIG. 10 illustrates another exemplary model of the beacon-rendering infrastructure, showing counterpart actions of the beacon-rendering user device (e.g., smartphone or other mobile computing device/system as discussed above) and cloud compute engine.

DETAILED DESCRIPTION

In various embodiments herein, a cloud compute engine applies geo-location information received from a mobile computing device to identify, within a database of geo-location markers, a bundle of geo-location markers corresponding to points of potential user interest within a prescribed proximity to the mobile device, transmitting the geo-location markers to the mobile device to be rendered in real time, on a display of the mobile device, as mixed-reality "beacons" overlaid on an image of an objective scene (captured by a camera/image sensor integrated within the mobile device) and anchored to geo-positioning coordinates of places/objects within the objective scene. By this operation, as a user moves/reorients the mobile device (or otherwise changes the field of view of the integrated camera), beacons corresponding to points of interest within the field of view appear in the mixed-reality display at locations corresponding to physical locations of the points of interest within the objective scene, enabling the user to identify, within the physical world, locations and other information regarding places/objects/persons of interest based on locations of the AR beacons within the mobile-device display.

FIG. 1 illustrates an objective scene 100 as may be perceived by a human observer (e.g., standing on a balcony) together with an image 101 of the same scene captured and rendered on a smartphone display 103 with a mixed-reality beacon overlay. In the depicted example, the smartphone (105) executes a software application ("beacon app") that reports the smartphone's global-positioning-system (GPS) coordinates to a cloud compute engine and, in turn, receives a geo beacon bundle from the cloud compute engine, the beacon bundle including GPS coordinates and metadata for previously created beacons within a predetermined radius of the smartphone. The beacon app (i.e., processor-executed instance thereof) filters the beacon bundle according to (i) user-specified and/or system-learned selection criteria, and (ii) the field of view of the smartphone camera (i.e., determined based on smartphone orientation and camera settings as discussed below) and then renders the beacons within the displayed image of the objective scene in accordance with the GPS coordinates of the beacons and corresponding places/objects within the image—in this example, anchoring respective beacons above:

- a restaurant together with a virtual "headline" indicating available tables/seating (120);
- a cocktail bar with a headline indicating that happy hour is underway (122)
- a pizzeria with a headline indicating by-the-slice pizza is available (124)
- an entertainment venue with a headline indicating that a live performance is underway (126).

FIG. 1 illustrates several important features of the mixed-reality beacon overlay. For one, beacons may be generated by one party for purposes of viewing by another (e.g., venue owner/manager creates beacons to be viewed by prospective customers/clients) and persist—in the sense of remaining viewable by others in mixed/augmented-reality—at the location where anchored (e.g., using GPS coordinates) even after beacon viewers and/or the beacon creator leaves the area. In a number of embodiments, the same beacon app enables users to both place and view beacons. Beacons are depicted with a sense of distance from the user, for example, with closer beacons rendered larger and further beacons rendered smaller (contrast restaurant beacon 120 vs. music venue beacon 126). Beacons additionally have a temporal/ephemeral characteristic in that their apparition (viewability) may last only a specified time, be scheduled for a predetermined time window (including recurring apparitions), etc. Dynamic and varied types of information and/or notifications may be displayed in association with a given beacon, including express text, logo and/or images within the beacon frame (shown as a circle in the FIG. 1 embodiment), beacon headline (oval window above the beacon frame, shown with text "tables," "happy hour," "slices," "live music" in the FIG. 1 example), and/or location pointer (the relatively long "tail" extending downward from the beacon frame). Logos, icons, and/or text within the frame or headline may include trademarks or service marks (e.g., Starbucks siren, McDonald's golden arches, etc.), information corresponding to instantaneous circumstances within the place of interest (seating available, specials, events, etc.), place or event names, etc. Additionally, in a number of embodiments, the user may interact with the beacon, for example by swiping (e.g., to remove from display) or tapping—the beacon app responding to the latter by presenting additional information regarding the corresponding events/activities upcoming or underway at the beacon-marked real-world location, including hyperlinks or other user-interactive widgets that may lead to further interaction (e.g., link to website, link to walking/driving directions that may then be shared with others). Moreover, beacons may present different information to different users in accordance with preferences/profile of the user-viewer and/or beacon creator and, more generally, may be viewed only by those specified by the creator (e.g., creator of the cocktail bar beacon may specify that the beacon is only to be presented to users of legal drinking age; creator of beacon for neighborhood gathering may specify a finite circle of neighbors as those able to view the beacon; etc.). Further, while the beacons depicted in FIG. 1 are associated with stationary brick-and-mortar businesses, beacons may also be associated with mobile objects—for example, the mobile phone of a user and/or beacon creator and thus the location of that individual as he/she moves about on foot or in a vehicle (e.g., beacon on ride-share automobile and/or beacon on ride-share passenger). Also, beacon app users may specify various filter criteria that limit rendered beacons to those the user wishes to see. In a number of embodiments, for example, the user may specify any number of specific categories of beacons (e.g., food, entertainment, lodging, events, friends, personal beacons, etc.), with further detail as to any specific category (e.g., Mexican restaurant, raw bar, whether pets are allowed, happy hour right now, etc.).

FIG. 2 illustrates an exemplary smartphone user experience/interaction with the beacon app, starting with launch at 151 (i.e., smartphone operating system responds to user tap on touch-screen-displayed icon by loading and commencing execution of program code corresponding to the beacon app), determination of camera orientation/field of view at 153, and then an exploration phase at 155 and 157. Though not specifically shown, the beacon app may prompt for and/or automatically acquire information needed to authenticate/validate the smartphone user as part of the application launch phase (e.g., prompting user to supply login credentials, acquiring/executing biometric identification, etc.). After or concurrently with launching the application (including user authentication), the beacon app ascertains or attempts to ascertain (note: references herein to beacon app/software performing action refer to actions implemented by an executing instance of the beacon app/software) the orientation/field-of-view of the smartphone in three-dimensional space—that is, which way the camera is facing as camera-generated video is displayed on the smartphone display and, more generally, any aspect of the smartphone orientation or imager settings (e.g., zoom, lens effects, shutter speed, etc.) that impact the camera's field of view (including depth of field). In one embodiment, the beacon app compares buildings, skylines or other recognizable features within live images of the user's surrounding (i.e., video images generated by the smartphone camera) with pre-existing images or other records corresponding to the smartphone's GPS coordinates—for example, orientation-assist images obtained from a cloud compute engine in response to submission of smartphone geo-location in an orientation-image request drawn from a pre-generated image data base. As a more specific example, images may be obtained via API (application programming interface) calls to a third-party image database (e.g., Google Street View, Apple Look Around, etc.). In those and other embodiments, orientation/FOV may be determined in whole or part using a smartphone's built-in compass, prompting the user to aim the camera in a due-North direction, through triangulation with known radio-frequency (RF) signal sources, by prompting the user to convey the smartphone in the camera-facing direction (i.e., to enable GPS-based determination of the direction of movement and thus the camera orientation) or any other manner of ascertaining a base camera orientation. Thereafter, as the camera is translated (moved in a directional orthogonal/perpendicular to the line of sight of the camera) and/or rotated, motion-detection sensors within the smartphone's inertial measurement unit (IMU) may be used to detect the change in orientation (which detection may be supplemented by ongoing comparison of imaged scene and pre-stored images, compass readings, etc.) and thereby continually present the smartphone's instantaneous orientation/FOV to an AR rendering engine for purposes of AR beacon overlay.

After orienting the smartphone-camera's field of view and receiving an initial beacon bundle from the cloud compute engine, the beacon app identifies a subset of the beacons within the geo bundle that (i) fall within the field of view and (ii) meet specified filter/selection criteria, rendering those selected beacons in real time as an augmented-reality/mixed-reality overlay on the objective scene shown on the smartphone display. As discussed below, in a number of embodiments, the beacon app maps GPS coordinates of the beacons (a deterministic distance away from the smartphone—as the smartphone's GPS coordinates are also known—and other beacons, as well as possibly other identified objects in the objective scene) to the objective scene represented in the camera/imager output, anchoring the beacons to corresponding features within the displayed scene so that, as the user pans about (i.e., translates/rotates or otherwise repositions/reorients the smartphone) and/or changes camera settings (e.g., pinching or spreading on the touchscreen to zoom in or out), the beacons remain anchored to (or above) the real-world places/objects that they mark. In the FIG. 2 example, for instance, two beacons appear in the display at a given instant, one marking the location of a conference venue (Moscone center) and the other marking a more distant coffee shop (Philz). As the user pans the camera (i.e., the smartphone), changing its orientation/field-of-view, the beacons remain anchored to their respective positions within the objective scene thus providing a fixed point of reference despite the camera motion. As the camera pans further and places/objects marked by the beacons fall outside the field of view, their beacons likewise drop out of view and, conversely, other beacons and corresponding places/objects appear within the rendered scene. Thus, though implemented by a mixed-reality overlay on the real-world objective scene, the beacons behave like (mimic the behavior of) real-world signs and banners as they appear (and the user perceives them) as fixtures within the objective scene. And yet, as the beacons are instead a virtual overlay, a rich and extensive set of supranatural behaviors and characteristics become possible as discussed below in the context of various applications and use cases. As a few examples, beacons may be implemented as ephemeral markers—appearing for only a limited time and/or at pre-scheduled times when their presence and any associated messaging matters most (e.g., the "live music" and/or "happy hour"

headlines shown in FIG. 1 refer to events underway—and other beacons may foretell imminent or upcoming events). Users and/or other agents (e.g., artificial intelligence operating on behalf of a given user) may filter the bundle of beacons available for view at any given instant or location so that the beacon app renders only relevant beacons (contrast fixed signage clutter over which an observer/viewer has no control). And beacons may be user-interactive, responding for example to user screen-tap by presenting additional information regarding the beacon-marked place/object, including hyperlinks and/or other pathways to additional relevant content. In the FIG. 2 example, for instance, a user-tap on the "Moscone" headline brings up additional information regarding the Moscone center, providing links to a Moscone website and walking directions to or within the venue. More generally, any information useful to the viewer and/or beneficial to the beacon creator may be displayed, including advertisements (e.g., including ads relating to user interests divined from prior user searches, user profile information, user social media posts or any other available source of information), messages posted by other users in connection with the venue (e.g., rating experiences of those users, or providing more detail), more detailed information/options regarding the venue (e.g., "click here for our happy-hour menu," "specials right now!"), opportunities for credits or other enticements ("share promo code 'MyReward' when you check in!") to name a few. Further to their ephemeral, just-in-time nature, creators may supplement beacon headlines (i.e., text or legend displayed above or otherwise in proximity to the beacon), logo fields (the beacon "circle"), tap-open text, etc. with information relating to immediate/ongoing events/circumstances—that seating is available at a restaurant or entertainment venue, that a performance is underway, that time-limited/quantity-limited pricing (happy hour) and/or featured products/services are available (two open bowling lanes)—information that tremendously expands the user's awareness of opportunities and experiences within the field of view. Moreover, as discussed in further detail below, beacons may be anchored not only to stationary places/objects, but to any moving object for which GPS coordinates may be tracked, including, for example, a moving smartphone or other object that iteratively reports its geo-location. Accordingly, a ride-share driver and passenger may both instantiate beacons that track their respective locations, enabling each to ascertain the position of the other within the real-world mixed-reality view implemented by their respective beacon apps. Likewise, individuals seeking in-person meeting/gathering/assistance/etc. may raise beacons to show their respective locations (e.g., within a crowded conference/entertainment/ amusement venue, sports arena/stadium, urban setting, educational venue, park, on-water location, highway/roadside location, etc.), including messaging to invite other participants ("pick-up basketball—players needed"), express warnings or help needed ("dangerous currents here!", "engine failure," "medical emergency," etc.).

FIG. 3 illustrates a number of the aforementioned beacon behaviors and characteristics, showing an exemplary categorical filtering feature at 171—i.e., beacon app responds to user-tap on miniature-map/filter icon 173 by presenting a dialog box that prompts the user to select one or more categories of interest (and, conversely, de-select other categories). The user may also affirmatively search (181) the title/headline/description of beacons within the bundle to isolate one or more beacons that meet the user's search criteria—the beacon app rendering only those search-match beacons or, depending on user specifications, those search-match beacons together with other user-selected categories of beacons (e.g., as shown by the checked "Food" and "Events" categories within the dialog box at 183). The beacon-app user may also tap a "2D map" icon 185 to transition between objective-scene beacon view and a two-dimensional (2D) map display (e.g., showing current location and surrounding beacons as in the example at 187), enabling the user to see a complete surround of beacons within a two-dimensional map-view display-again, filterable according to user and/or system specifications and preference settings. In yet other embodiments, the beacon app may automatically transition between objective-scene beacon view and 2D map view in response to detecting a re-orientation of the smartphone camera to a down-facing view as shown in FIG. 4. In one implementation, for example, the beacon app monitors the output of an inertial measurement unit (IMU) within the smartphone (and/or performs skyline detection, etc.) to determine when the user has rotated the smartphone to a ground/sub-horizon-facing orientation, progressively displaying the 2D map view as a horizon-aligned objective scene disappears from view (i.e., as if the user swiped up to display the 2D map view—another UI input that may bring up the map view). In the specific example shown in FIG. 4, the lower portion of the objective-scene view, showing tails or other extensions of the beacons may remain in view to orient the user with respect to forward-facing direction.

As discussed, users of the beacon app may both view and create beacons, the beacon-creation feature being available, in at least one embodiment, at no-cost to system subscribers as to base-level beacon characteristics. In one implementation, a beacon app user launches the beacon create function by pressing a "create" icon as shown at 201 in FIG. 3—a touchscreen tap/press to which the beacon app responds by guiding the user through a set of informational prompts shown, for example, in FIGS. 5A and 5B including (without limitation) presenting a beacon-anchoring display 211 (rendered on the smartphone display with anchor-grid overlaid on an objective scene as shown at 212) prompting the user to tap a grid location and thereby anchor a new beacon at a specific location within an objective scene; prompting the user to supply a name and description as shown in screenshot 215 (including creating and/or importing hyperlinks or other dynamic features, specifying the apparition duration of the beacon, specifying a viewer-distance from the beacon at which the beacon is to become visible, specifying filter/search categories for which the beacon will appear); prompting the user to add stylistic beacon features/characteristics (221), prompting the user to specify an audience with which the beacon will be shared/be viewable (e.g., everyone, one or more circles of friends/contacts, specific individual(s), or specifying the beacon as private to the user) as shown at 231 in FIG. 5B, etc. In a number of embodiments, users may pay (with currency, non-fungible tokens, system credits or any other viable medium of exchange) to extend various beacon features beyond default limits, including extending the apparition duration/distance (time interval and distance, respectively, over which beacon is visible to system users) or enabling scheduled recurrence, providing a richer, more advanced set of search keys (i.e., terms causing the beacon to appear within a user search), adding additional beacon style touches ("flair"), including enhanced visual effects (brightness, animations, etc.), corporate logos, more detailed headline or description options, and so forth.

FIGS. 6A and 6B illustrate an exemplary set of user profile screens that may be displayed by the beacon app (e.g., in response to user navigation, commencing with tap on a user-profile icon (e.g., as shown at 240 in FIG. 5B and likewise in screen-shots shown in FIGS. 3, 4 and 5A). In an opening profile screen (251), the user's name, initial membership date and subscriber status (e.g., free, personal, professional, pro-plus, etc.) are shown, together with various usage metrics including, for example and without limitation, number of beacons created by the user, the number of times a user has "checked-in" at a beacon site, a number of user-groups (i.e., "circles" each including one or more users in addition to the profiled subscriber), and contacts known to the beacon app. A user may elect to view more advanced application settings and/or profile settings/information by tapping on settings icon 253 or advanced-profile icon 255, respectively. Also, in the exemplary FIG. 6A/6B embodiment, the profile display enables the user to select from a number subject/feature headings, each expanding to show more detail with respect to a given subject, including achievement badges offered to incentivize various user actions/behaviors (e.g., issuing invitations to view beacons, accepting invitations to view beacons, creating beacons, checking in at beacon locations, etc.). In the specific example shown in screen 251, for instance, a user/subscriber status badge is shown (beta member in this case), together with (i) quantities of beacon-visit invitations issued/accepted, beacons created and check-ins, and (ii) progress counts—e.g., 64 check-ins relative to 80-check-in threshold in an example shown at 267—toward creditable and/or status enhancing achievements (e.g., receiving credits that may be applied to pay for beacon enhancements or other benefits within the beacon app and/or exchanged/validated at beacon-creator sites to receive goods/services—as discussed below). The beacon-app user may also view additional detail with respect to self-created beacons as shown in exemplary screen shot 271, displaying active beacons with remaining duration (i.e., time before beacon expires and is no longer instantiated within subscriber/user view), beacons created during a specified interval (per-month in the depicted example), etc.

Continuing with user profile options, the user may create and edit friend groups ("circles") as shown in exemplary screen shots 281 and 283 (FIG. 6B), in one embodiment clicking the '+' icon shown at 285 in screen 281 to add a circle or tapping a pre-existing circle (e.g., 282) to add/remove members (e.g., according to individual contacts from user's contact list, from contact-search results, etc.), for example, dragging icons corresponding to respective contacts into or out of grouping rings 291, 293 corresponding to respective circles (or clicking "contact-add" icon 295 to present an additional contact within "create circle" display 283. After adding/dragging contact icons corresponding to a desired group of individuals into a graphical circle (e.g., 293), the user may tap "create a circle" 297 to create a new contact circle consisting of those individuals.

FIG. 7 illustrates additional detail with respect to a beacon rendering system 300 showing, in this example, a user smartphone 301 as the client-side mobile computing device having a display 303 on which beacons will be rendered (an automotive head-up display, augmented-reality or mixed-reality glasses/eyewear, tablet, or any other display within an integrated or distributed (e.g., automobile) computing environment may constitute the rendering device in alternative configurations/embodiments) and its wireless and/or wired interconnection to a cloud compute engine 305 (e.g., one or more co-located or distributed server computers) via communications network 307 (e.g., via Internet, intranet or any other communication medium, including cellular base station or other network-edge pathway to the Internet/intranet).

As shown in detail view 320, smartphone 301 may be viewed, at least conceptually, as having a processing unit 321 (one or more processor cores), memory 323 (e.g., constituted by any combination of volatile and/or nonvolatile memory subsystem installations), communications hub 325 (e.g., including, without limitation, 802.11 Wi-Fi, near-field communications (NFC) radio-frequency input/output, Bluetooth I/O, infrared I/O, etc.), user interface 327, and sensors 329, the latter including, for example and without limitation, one or more image sensors and associated processing engines (the latter implemented in whole or part through program code execution within processing unit 321), GPS receiver/signal-processing unit, inertial measurement unit (IMU, including accelerometers, gyroscopes, etc.), magnetometer/compass, sonar and/or lidar module, temperature sensors, proximity sensors, etc. User interface 327 includes display 303, touch interface (including explicit buttons and those overlaid on the display to implement a touchscreen), microphone(s), speakers, proximity sensors and/or user-facing camera (i.e., a sensor that may be used to capture gestures, facial movements, biometric identification, etc.) haptic elements and so forth. Despite star-interconnect depiction (i.e., processing unit 321 coupled to each other smartphone component block via dedicated bidirectional path), the various smartphone component blocks shown at 320 may be coupled to one another in any practicable interconnect topology, including various point-to-point links as well as shared buses.

FIG. 8 illustrates an exemplary beacon-app execution flow implemented within the mobile compute device shown in FIG. 7 and other embodiments above. Following launch at 351 (e.g., in response to user screen-tap or other action), the beacon app acquires login data from the user at 353—prompting, for example, username/password entry and/or auto-collecting biometric verification (face-ID, fingerprint, retina scan, etc.)—and then forwards that login data to the cloud compute engine for verification, receiving confirmation/authentication (or the opposite) in return. After completing the login, the beacon app acquires global positioning coordinates from an integrated GPS module (i.e., a component of the sensor bank 329 shown in FIG. 7) at 355, outputting that geo-location information to the cloud compute engine in an implicit request for a geographically oriented beacon bundle—a block of data (returned by the cloud compute engine as shown at 356) containing all information needed for the beacon app to render beacons within the smartphone-camera's field of view. Accordingly, at 357, the mobile compute device determines the orientation of the integrated camera (which may be a camera within a distributed-component compute device, such as a windshield- and/or grill-mounted camera within a mobile vehicle having an in-cabin/under-hood processing unit) and thus, in conjunction with camera settings (zoom, lens effects, etc.), the camera's field of view. At 359, the mobile computing device (executing constituent program code of the beacon app) identifies the subset of beacons from the geo bundle that fall within the camera's field of view, rendering those beacons in mixed-reality overlay onto an image of the objective scene. Thereafter, the beacon app execution continues in the form of an event loop, determining whether user input (or cloud-compute input) has been received at 361 and, if not, iteratively executing the operations at 355, 357, 359, 361 to push geo-location information to the cloud compute engine (e.g., as the user moves), track/acquire/re-acquire orientation (e.g., monitoring smartphone motion via accelerometers/gyroscopes within the multi-axis IMU to detect re-orientation of the smartphone relative to the initially acquired baseline orientation), rendering beacons—collectively displaying (on the smartphone display) a live video feed of an objective scene to the user with mixed-reality beacons anchored to features in the scene as though they were physically present in the objective scene—and responding to possible input. At each pass through the event loop, the beacon app (i.e., executing instance thereof) processes any input received from the mobile device user and/or cloud-compute engine, including input provided in connection with beacon creation, filtering/searching, navigating and/or profile update, to name a few. More specifically, the beacon app responds to input indicating that a newly created/edited beacon is to be published or otherwise shared (363), by pushing the beacon information to the cloud compute engine (server(s)) for storage within the beacon database (thereby enabling that beacon to become part of subsequent geo beacon bundles downloaded to specified and/or all beacon-system users). Similarly, the beacon app likewise responds to profile information update (365) by pushing updated profile information to the cloud compute engine (e.g., updating login credentials, user preferences, etc.).

FIG. 9 illustrates a more detailed set of actions executed by a rendering engine (implemented by beacon-app program code execution) to render beacons within a displayed scene (i.e., digitized image of an objective scene). Starting at 375, the rendering engine identifies the subset of beacons within the geo bundle having GPS coordinates within the current field of view (FOV) and that meet any filter/selection criteria. At 377, the rendering engine aligns a 3D coordinate map with the displayed scene—for example, mapping height/width/depth dimensions onto a digitized representation of the objective scene to enable determination of positions (e.g., pixels or pixel regions) within the digitized image of the objective scene corresponding to geo-positions of counterpart real-world features (i.e., the latter indicated by respective GPS coordinates). An example of this operation is shown conceptually at 379 by a Cartesian grid overlay on a three-dimensional model of the objective scene (grid may instead be triangulated/pyramidal regions in 3-space and/or a polar-coordinate overlay (e.g., a cylindrically or spherically contoured mapping)). At 381, the rendering engine displays (renders) beacons as an overlay within the image of the objective scene, positioning/anchoring the beacons within the displayed scene according to the coordinate transform (alignment map/grid), with beacon height/sizing according to distance from the perspective location (i.e., location from which the objective scene is imaged/perceived by the smartphone's camera). As discussed, various other features of the beacon (headline, color, logo, icon, animations or other flair) may be specified by the beacon creator. Moreover, as discussed below, beacons may be rendered in a number of specialized ways to account for obstructions (e.g., buildings, trees, billboards, etc.) between the perspective location and the geo-location of interest—for example, rendering an otherwise obstructed tail of the beacon in dashed outline (while the upper portion of the beacon is raised above the obstruction), rendering beacons with varying degrees of transparency, headlining the beacon as corresponding to an obstructed-view location, etc.

FIG. 10 illustrates another exemplary model of the beacon-rendering infrastructure, showing counterpart actions of the beacon-rendering user device 401 (e.g., smartphone or other mobile computing device/system as discussed above) and cloud compute engine 403. As shown, a human operator 405 interacts with the smartphone's user interface 407 to supply user-created beacon information—information that is applied by the beacon app (launched and hosted by the smartphone operating system 409 (e.g., iOS, Android, Symbian, BlackBerry OS, MS Windows Phone OS, etc.)) to prepare a local beacon record (411) and then share/publish that beacon (415) by pushing/transmitting the beacon data to cloud compute engine 403 (conveyed via Internet and/or other wireless/wired digital communications network as discussed). Cloud compute engine 403 responds to the incoming beacon information by adding a corresponding beacon record (421) to a system beacon database (423—the "primary beacon store"). Accordingly, when beacon-rendering device 401 (or the smartphones/rendering devices of other system subscribers), supplies geolocation information as shown at 425 (e.g., GPS coordinates generated by a GPS receiver/sensor), the cloud compute engine responds by querying beacon database 423 to identify beacons within a geographic area centered at the user-supplied geo-location (e.g., within a specified or predetermined radius of smartphone GPS coordinates)—generating the aforementioned geo beacon bundle (427) which the cloud compute engine then pushes to the client-side device (429). In one embodiment, the cloud compute engine periodically/iteratively re-generates and re-sends the beacon bundle according to changes in the client-device location (425) and/or updates to beacon database 423. The client-device-hosted beacon app receives (431) and locally stores (433) each incoming geo beacon bundle (regional beacon bundle) and thereafter filters the beacon bundle (435) in accordance with the orientation of the client-device's orientation/camera-FOV (e.g., determined based on images of objective scene, compass readings, IMU outputs, etc. supplied from sensors 436) and stored settings 437 (e.g., filter settings and/or search parameters supplied by the user via user-interface 407) to identify and supply to UI 407 a specific set of beacons to be rendered (together with accompanying notifications). A local data base of user-supplied preferences 439 (and/or general settings) may also be applied in the beacon-display determination at 435 and/or conveyed to the cloud compute engine when subscribing to beacon updates (thus enabling the geo beacon bundle to be filtered by the cloud compute engine at least to some extent).

The various beacon-rendering systems, devices and methodologies described above may be implemented with respect to outdoor and indoor scenes, both of which share some implementation challenges (e.g., displaying beacons for view-obstructed places/objects) and each of which present some particular challenges (e.g., no mapping APIs available for many indoor venues such as indoor/stadium conferences, festivals, sporting events, etc.), few landmarks and/or available mapping for various "pop-up" venues such as festivals (e.g., Burning Man, Firefly, Coachella) and so forth. In those environments and the more general cases discussed above, the beacon-rendering device may leverage, in any combination, various inputs/techniques/algorithms discussed below—e.g., magnetic north, street-view/look-around, image recognition, shadow detection, geography landmark identification, IMU to name a few—to determine what direction the rendering-device camera is facing as the user looks "through" the camera video of the device at the real world (i.e., "camera orientation" or "user orientation"). Knowing user/camera orientation enables the rendering device to accurately position/anchor the mixed-reality beacons on the two-dimensional display of the rendering device.

Magnetic North: the magnetometer provided in most smartphones (and in modern vehicle navigation systems, mixed-reality/augmented-reality eyewear, etc.) can detect the earth's pull toward magnet north. Knowing which direction is north in relation to smartphone/device orientation enables determination of the camera-facing direction.

Image Recognition using, for example, Street View or Look Around makers of mapping software such as Google and Apple have gone to extensive efforts to collect image data for commonly traveled locations, referred to as "street view" (or "look around") data. Street-view images are generally tagged with location data (e.g., GPS coordinates) and are made available to third-party applications (e.g., via API). In various embodiments herein, the beacon-app (i.e., executing instance thereof) compares images in the instantaneous camera feed with street-view image data to determine which direction the user is facing. As discussed above, the beacon app may prompt the user to scan nearby buildings or other street-view-identifiable features (i.e., wave/pan the camera) to search for images/features that match those in the street view database for that location. Match detection enables the beach app to accurately determine user/camera orientation, establishing, for example, a baseline from which IMU-detected camera rotation/movement may be referenced.

Shadow Detection: If the user (and beacon-rendering device) is outdoors in sunshine, the beacon-rendering app searches the imaged scene for shadows cast by the sun. Because the location, date, and time is known to the system, the user's orientation can be determined by measuring the angle of the shadow (i.e., the beacon app knows the user's precise location on earth using GPS of the wielded/occupied device, and also knows where the sun is in the sky on a particular date and time for that location) and thereby determine which direction the device/camera is facing.

Sun/Star/Moon Location: The beacon app may instruct the user to point the smartphone camera at the sun or moon during the daytime or, at night, a given star (e.g., Polaris) or stellar constellation (Orion's Belt, for instance) to determine user orientation. The system determines the user's exact location on Earth using GPS, the date and time via the operating system, and applies those parameters to determine where in the sky the sun/moon/star/constellation should be. Accordingly, when the user aims the smartphone camera at the subject celestial object, the beacon app may ascertain what direction the camera is pointing. The beacon app may automatically detect the sun (or moon, or star, etc.) in the camera view using image recognition techniques and derive the user's orientation from the detected position.

Geographic Landmarks: The beacon app may search images of an objective scene for identifiable geographic landmarks (ocean, mountain range, lake, etc.), monuments (Eiffel Tower, Statue of Liberty), iconic buildings (Chrysler building, TransAmerica Pyramid) and the like. Upon identifying such landmark or other feature, coordinates of the landmark and those of the imaging device (and/or location of the landmark within the imaged scene) may be used to determine camera orientation. If the landmark(s) are not visible in the imaged scene, the system may prompt the user to aim the camera in the general direction of the landmark and press a button or otherwise supply input to indicate that the camera is facing the landmark direction.

Street Scene Text Recognition: the beacon app may search the surrounding scene (imaged by the camera) for alphanumeric strings and apply any identified string instances to determine (or more finely resolve) the camera-facing direction. For example, street labels, address labels, and business names can all be recognized and used, in conjunction with mapping software, to determine camera orientation.

Leveraging the IMU: After an initial determination of camera orientation (e.g., using one or more of the methods above), the beacon app may track movement of the rendering device (and thus the device's integrated or associated camera) via an inertial measurement unit ("IMU") during the rendering session to iteratively update the view orientation as the user pans or otherwise changes the camera position/orientation.

In a number of data-analytics embodiments, the beacon-rendering system collects anonymized data on an on-going basis which captures aspects of usage, performance, and other key metrics for the system. This data can be used both for specific beacons and overall aggregated data for the system.

Individual beacon data can include: how often a beacon is seen by users of the app, how many of those people engage with the beacon location, and the demographics of those people (such as gender and age category). This data is useful to the creators of beacons because it allows them to see the effectiveness of their marketing and advertising efforts. A restaurant, for example, can find out how many people see their beacon advertising a dinner special, how many of those people end up visiting the restaurant, and what the age categories of those visitors are. The restaurant could try beacons at different times of the day, with different messages and appearances, to see which approach is most effective.

Aggregated anonymized data for the overall system is also collected, and as the app is used more and more, this data can provide valuable insights into the overall way people move throughout the world. For example, imagine a company is considering opening a new restaurant and has several potential locations in mind The company could subscribe to the data collected by the system and compare the density and demographics of people at each potential location (as determined by beacons viewed, beacons engaged, beacons placed, and so on). This level of geographical data and insights would become very valuable in making the decision about which location to choose for the new restaurant.

Users who subscribe to data and analytics features may access them via an internet interface to a webpage using their credentials. Beacons can also be viewed and managed using this web portal.

Developers of other mobile applications may embed a beacon experience directly into their app using a supplied software developers kit ("SDK"). In a similar way to how many apps contain a map view embedded into the user experience, they may also embed an AR beacon experience. The SDK provided by the system will allow developers to create the AR beacon view within their software (mobile app, web view, computer application, heads-up car display, and so on).

Developers may create, edit, delete, and maintain multiple beacons records via a web interface (e.g., web portal). This is also useful for organizations with a large number of beacons to maintain, such as festivals, conferences, and businesses with multiple locations. The web portal supports an import function so beacon records can be created from existing event listings, and so on. Using the web interface, beacons can be organized in groups, sub-groups, and sorted according to data in the records. The interface can also be used to view statistics and analytics for individual beacons, groups of beacons, and/or all the beacons associated with the account.

The beacon data record itself may be implemented by a multi-part data object. In one embodiment, for example, the beacon (or sign or marker) record may include the following fields (each of which may include sub-fields):
  record name
  unique identifier
  beacon originator
  public/private (list target audience)
  audience sub-category
  category (for filtering)
  filter sub-category
  latitude location/coordinate
  longitude location/coordinate
  beacon name
  beacon icon
  beacon photo/video
  beacon description
  start time
  end time
  start date
  end date
  recurrence
  visual appearance
  altitude The following additional and/or alternative features may be implemented within the various beacon-rendering embodiments discussed above:
  Beacons/Markers may be rendered in various form-factors, including as rectangular (or square or elliptical, etc.) signs, balloons, skins (e.g., virtual coverings over building facades, vehicles or other places/objects of interest), etc.
  beacon app uses the smartphone's forward-facing camera to allow the user to hold their phone up, look "through" the phone via the built-in camera, and see visual markers super-imposed on the camera images of the real world around them by the software. Similarly, other AR-equipped devices will allow the user to see the visual markers imposed on the real-world scene
  beacon app code is executed by a processing unit (and resides in whole or part within integrated storage) of a smartphone, AR glasses, or other medium capable of displaying augmented reality elements to the user in the real world. "Beacons," "Signs" and "Markers" constitute fundamental data structures within the beacon app. Those data structures are created by the beacon app and stored in the cloud (e.g., storage database maintained by cloud compute engine—one or more server computers, for example, within a data center). The beacon rendering system (cloud compute engine and mobile compute device wirelessly coupled thereto) allows the user to interact with the real world by looking through the camera of their mobile compute device with mixed-reality beacon overlay rendered by the beacon app.
  Functional blocks of the beacon app may include, for example, and without limitation:
    privacy/security engine
    account management engine
    finance engine (in-app purchases)
    dynamic visual effects
    occlusion management engine
  Beacon/marker data objects may be characterized, for example and without limitation, by:
    exposure list (who can see)
    metadata—user may (optionally) input meta data associated with that beacon, such as what type of activity it is, whether or not it costs money, and so on. These parameters serve as inputs for a search engine that will make the beacon viewable to the appropriate audience. Examples of parameters that may be entered when creating a beacon include
      activity type (leisure, food, entertainment, exercise, socializing, networking, and so on)
      whether the beacon is permanent or temporary With regard to beacon rendering accuracy, various technologies/algorithms may be applied to accurately determine the locations (and rendered placements) of beacons/signs/markers in relation to the user's location, including (for example and without limitation):
  Global Positioning System (GPS)
  algorithmic fusion of inputs from smartphone sensors (compass, IMU (accelerometers, gyroscope), Wi-Fi/Bluetooth, near-field RF, sonar, lidar, cell tower signal etc.)
    accelerometer and gyroscope can help in knowing when the phone is turned/moved
    relative signal strength of Wi-Fi and Bluetooth RF signal from Wi-Fi or Bluetooth hubs stationed at a known location used to resolve location.
    cell signal can also be used by taking into account cell tower locations and signal strength.
    Sonar, LiDAR, and infrared can help inform about the immediate surroundings (including indoor and outdoor)
  database of images containing the "street view" (typically seen in mapping software) and tagged with a precise location
    compares images in the database with the image being viewed by the user in the beacon app, and if a match is found, the user's location and the direction they are facing is updated
    user arrival/checks-in at known destination—feedback to system and incorporated to further improving positioning accuracy Additional (and/or re-stated) innovative aspects of the various beacon-rendering systems disclosed herein include, for example and without limitation:
  mixed-reality marker or "beacon" corresponding to place/object location in the physical world and is displayed in geographical association with that physical location within an image of the real-world setting. In a number of embodiments, beacons emulate a search light (moving or stationary) shone into the sky to attract people to a place or event.
  beacons positioned on the display such that their origin is at, above or otherwise geo-associated with the location of the place/object/event of interest, but the "beam" of light is directed upward on the screen so-as to allow multiple beacons to appear at once. The "circle" at the apex of the beacon may contain an image (or a cut-out of an image) that provides information pertaining to the event being designated by the beacon.
  beacons virtually persist at their anchored location (i.e., using latitude and longitude coordinates provided by the GPS system) even after the creator of the beacon or viewers of the beacon leave the area from which the beacon may be viewed.
  beacon attributes, such as color, label, type, who its intended for, and many more can be set by the user who creates it. This metadata, along with the GPS location is stored in the cloud for each marker.
  execution of beacon rendering app on broad variety of mobile devices including, for example and without limitation, smartphones, AR (augmented-reality) headsets, AR glasses, heads-up displays in mobile vehicles (including water craft), and any other practicable mobile augmented-reality/mixed-reality compute devices. In at least some embodiments, the beacon rendering app uses data spatial visualization (DSV), artificial intelligence (AI), and/or augmented reality (AR)/mixed reality (MR) to help people re-engage with the real world around them.

"beacons" and "signs", direct the user to real-world locations and events of interest in response to user-specific search criteria beacons may generally be pinned/anchored to a geographic or object location, and project a line or similar graphical depiction in a way that is visible to the user (e.g., a vertical line projecting upward, arrows pointing downward toward the location, and icon, badge, surround or the like spinning or moving or otherwise animated to draw viewer attention, and so on).

mixed-reality signs are also pinned to a specific geographic location, but may be more localized and typically intended for a single recipient (signs may be viewed as specialized beacon/marker instances).

visual markers and additional information can be displayed on wearable devices such as an augmented reality headset or glasses (in place of the hand-held smartphone). visual markers and additional information can be projected onto the windshield of a moving or stationary vehicle.

beacons can both be placed and viewed by users of the beacon-rendering software application.

beacons may be used to direct the user's attention to events and locations around them and point to the associated location in the real world.

beacon app can provide incentives for people to discover and attend social events and other activities around them—e.g., gamers whose incentive to engage with the real world is tied back into their virtual gaming environment by way of credits, experience points, and other rewards within the games.

beacon app helps users see what events are taking place near them and may register a "check in" when the beacon app user participates in those events;

a beacon app user can tap on an event's visual indicator (beacon or marker) to learn more about the event and can choose to attend the event (e.g., reserving such opportunity) by through interaction with the mixed-reality beacon. The application's augmented reality interface will then guide the user to the event (e.g., using an interface to mapping/navigation infrastructure on the device).

beacons can be viewed on a more traditional 2D (two-dimensional) map visualization in the app for when the user is indoors, the view of the real world is too occluded, or the user simply prefers to see the information without using augmented reality. Different visual treatments of beacons can be applied in the 2D environment, similarly to how that are in the AR environment.

a user may launch the beacon app and instantly see what events are taking place in the real-world around them.

beacons are shown with a sense of distance, for example getting smaller the further away they are from the user, and taking into account the curvature of the earth in a number of embodiments, occluded places/objects of potential interest (i.e., line-of-sight view to the place/object is blocked by an obstruction) may be designated by features within the beacon. As an example, the line emanating below the beacon info bubble (i.e., beacon "tail") becomes dotted at the point of occlusion.

beacon enhancements and/or achievement credits may be purchased via the beacon app.

distance at which a standard beacon can be viewed (i.e., rendered onto mobile-device display) defaults to a fixed radius (e.g., 1 mile) for free beacons, as well as a fixed time (e.g. 2 hours). Upon payment of a fee (e.g., in the form of currency, system credits, commitment to monthly plan, etc.), the radius at which the beacon can be viewed may be increased (e.g., $1 per mile), as can the time interval over which the beacon is viewable (i.e., apparition time)

beacons provide fertile opportunity for real-time, proximity-based marketing commercial beacon can be given attributes that make it more noticeable. For example, it can be prioritized in search results, have a more distinct visual appearance (including, but not limited to a different color, shape, movement, intensity, animations,), have a larger viewable radius, include visual previews of what's happening there, and so on Commercial beacons can be thought of as 'ads' similar to what appear in a social media feeds or search engine results in the virtual world users of the beacon rendering app can specify what types of beacons they are interested in seeing, doing so through settings and search parameters they enter while using the beacon app.

in a number of embodiments, beacon-app users may always view their own beacons. Beacon app users can also hide any beacon or groups of beacons from their own view (e.g., filtering).

beacons can become visible to beacon app users prior to the event or activity taking place as a way to inform people that is coming up so they can plan for it ("pending beacons").

pending beacons" have a different visual appearance from live beacons. Such beacons can be displayed as the result of a search (such as "show me live entertainment that is planned for this weekend."

while beacons can be placed in real-time with a fixed duration, they may also be scheduled for a determined time in the future. These beacons can be searched for in a "future events" category Beacons have a configurable lifetime. Upon creation of a beacon, a user will select a duration time with a default and max time limit. In commercial applications, businesses will be able to purchase additional duration time and/or permanent beacons.

beacons may be rendered with different appearance according to the beacon app user (e.g., based on user profile and/or settings), distance from the beacon-app user, type of category, the height and width of a beacon, etc.

beacons may be rendered with varying size and Z height (meaning the perceived distance in the sky)—for example, as the beacon app user moves nearer to the beacon, the beacon may become (i.e., be rendered) larger and with lowered or increased Z height.

beacons may be rendered in a manner reflecting remaining apparition time—for example, explicitly stating time remaining (e.g., in headline or click-to-see information), progressively reduced width/diameter, progressively fading color, increasing transparency, etc.

beacons may represent limitless variety of places/objects/things/persons/animals, including but not limited to, businesses, events, activities, friends, pets, places of interest etc. This could be confusing if all beacons appeared the same, so the beacon app may render beacons with varying color, shape, and other attributes to indicate different types of beacons.

authorized user of the beacon app can create beacons, specifying coordinates and other information as discussed above, together with specification of finite (or unlimited) sets of other beacon app users that are enabled to view the beacon standard beacons can be created at a nominal or no cost. The appearance, longevity, and distance at which the beacon can be viewed is set by the policy of the app beacons may mark stationary or mobile objects (including individuals). Stationary beacons may be anchored at the latitude and longitude specified by the beacon-app user (e.g., loading GPS coordinates of place or stationary object of interest and/or capturing the location/GPS coordinates of the mobile device used to create the beacon). If mobile, the beacon will follow a mobile device or system that reports its GPS location (e.g., mobile device used to create the beacon).

Other innovative aspects/features of the beacon-rendering system include, for example and without limitation:

Anchoring AR Geo-markers (Location and Direction/Orientation)
Anchoring AR geo-markers using street-view images from OS manufacturers
Anchoring AR geo-markers using crowd-sourced images (side-walk view)
Anchoring AR geo-markers indoors by scanning the scene
Anchoring AR geo-markers by taking a photograph when the beacon is placed and storing as street-view data
Anchoring the AR Geo-markers by asking the user to face north, south, east, and/or west during a calibration procedure
Using one or more methods to determine user orientation when street-view data is not available, including landmark recognition, shadow detection, sun location, and/or manual input from the user.
Environment Detection
Skyline Detection
Occlusion detection (buildings, vehicles, plants, trees, people)
Monetization
Limiting the distance of AR geo-markers
Limiting the display time of AR geo-markers
Providing a way to extend the viewable distance and display time of AR Geo-markers through payment
Beacon Types
AI algorithm that determines most-likely AR geo-markers to display to a user
Public AR Geo-markers
Private AR Geo-markers
One or many friends, or self
Placing ARGM's with a message for yourself that persists
Placing ARGM's with a message for others that persists
Data Collection
Crowd-sourced images (to augment street view)
Collecting geo data with demographic meta tags
Platform
  a. software development kit that enables other app developers to embed the beacon-app experience within their own third-party app. (similar to how Google maps can be embedded)
  b. Cloud-based vs. Local (pre-downloading a geo-beacon bundle in cases where Internet/Cellular service is not available, but GPS is)

Various innovative use-cases for the beacon-rendering app and system include, for example and without limitation:

Beacons can be used to spontaneously broadcast events in real-time
help people who are addicted to in-home gaming by creating incentive for them to get out into the real world from time to time—Incentive to the gamer is provided in the form of experience points or some other credits which they can use while playing their computer game of choice, but which can only be obtained by completing a real-world social networking event using PROXDR
business owners to do proximity marketing. Proximity marketing will allow places of business to display Beacons that direct nearby potential customers to their business or event. The range, visualization, duration, and other factors associated with the retailer's Beacon can be modified by the retailer to attract more potential customers at a greater distance. These enhancements may be purchased in the app using in-app credits and/or paying a fee with real or crypto-currency. Examples:
  bowling alley may have a late cancellation and unexpectedly have lanes become available—managers of the bowling business can place a beacon at their front door and immediately advertise its available capacity to interested users nearby
  local retail businesses, restaurants with available capacity, last-minute ticket opportunities for sporting/concert events, garage sales, realtor listings and open houses, local clubs and bars, nearby live entertainment, meet-ups, on-line dating apps, ride-sharing apps (a beacon to show where the approaching driver is), and many more. Effectively, anyone that has something to sell could use a beacon to help them do so
a group of athletes may come together randomly at a neighborhood basketball court, but need a few more people for a game of pick-up. They could broadcast "players needed" via a beacon that others in the neighborhood can see and respond to . . . "impromptu beacons"
help everyone interact socially with others. People who are like-minded or have common interests can find one another and meet via Beacons. This is differentiated from other apps that do the same things (such as "Meetup") due to the augmented reality real-world aspect to PROXDR beacons; they not only inform the user of potential social interactions, but also show them in the real world where they are taking place
health/medical: special health-related Beacons can be created and prescribed by qualified physical and mental health practitioners
Physician can prescribe specific beacons to their patients by creating the beacon and sending it directly to them. Examples:
  a health-related Beacon may direct a patient to the trail head of a hike, or to gym, or a park
  mental health: mental health professionals to prescribe activities that will help contribute to the well-being of their patients
  prescribe beacons directing their patients to healthy places to eat, good exercise facilities, walks in a park, and to engage with others in positive social experiences. These same medical professionals could also monitor the patients' compliance to visiting these beacons, thus providing a feedback loop to improve care. The patients could also rate how effective the beacon-encouraged activity was and provide that input as feedback to the healthcare provider and the system in general artificial intelligence ("AI") to learn what types of activities the healthcare professionals prescribe, and which ones have the most impact and then apply that intelligence by making suggestions for beacons for a given user. This AI experience could help the doctor, the patient, and even others not under medical care system provides a new form of encouragement and rewards for its users to participate in physical activities (such as hikes, walks, runs, bike rides, and other movement activity)

place a Beacon to define a meeting place, such as a park or their home. Beacons don't necessarily have to be associated with a paid event or retail business. In many cases, they can simply be used to help people find one another—a user may display a Beacon that only their friend can see to meet up at a fair, large music festival, or any place where it is difficult to find one another.

beacons can be used for time-sensitive advertising. For example, a Beacon host could display a Beacon advertising a time-limited special and/or a limited quantity special. The Beacon would convey the time-urgency of the opportunity with a count-down indicator, for example Transportation Applications
Maps Integration
Linked to Ride Sharing platform
Mobile Service Providers/Roadside Assistance
Delivery Services
Driving Directions and Head-Up Display
Walking Directions
Proximity-Based, Temporal-Based Beaconing
Trending beacons and user-interaction with beacons may be used to track how popular a specific activity is based on several metrics such as but not limited to: visits, ratings, attendance over time, user demographics, number of times shared, number of times prescribed and so on. These activities can be presented to PROXDR users as "Trending" and may have additional visual characteristics to make them stand apart Partner with Businesses (e.g., loyalty, incentives, user-accentuated beacons)

Beacon Subscription (user may subscribe to an event by selecting its beacon—token provision or other credit for attending the event—example, scan a token to get credit)

Searching in Maps Software (Beacons on map search results)

a user searches in their map software for a desired destination, BEACON APP could place a beacon on that location to then make it easier for the user to find—specific example: if a user searches for "Starbucks nearby" from a downtown location, beacon app would make it easy by providing a beacon to point the way someone who is lost, stuck, or otherwise needing help can place a Beacon on themselves to assist others in finding and helping them system activities that reward user actions like steps, check-ins, making friends, meet-up events, impromptu games, and so on (e.g., rewards may be system credits)

business offering credits for offered activities—e.g., bowling alley granting beacon app credits for completing a game of bowling, they could advertise and offer beacon app credits as well. This information could be shown on their beacon as a way to attract users to frequent their establishment Businesses could charge an admission fee, for example, that could be paid in beacon app credits. The business could then in turn spend those credits on enhanced beacons, driving more customers to their establishment business could waive a cover charge, typically assessed at the time of admission, if a beacon app user agreed to place a beacon showing they were at the establishment. In other words, placing an "in attendance" beacon could earn beacon app credit that could be used to pay the cover charge Supplemental Innovations users of the system can pay for extra features when creating a beacon that makes it more prominent than conventional beacons Commercial beacons can also have special incentives attached to them such as coupons, limited offers, and so on to encourage users to engage with it Users can also view beacons that trusted others send to them (such as their doctor or friends). In one embodiment, beacons sent by others are viewed as an incoming message. Recipients of the message can choose to view the beacon or not from the message viewer system learns from the settings specified by the user, which beacons they engage with, and the activities of others who have similar interests, and then can offer the user AI-generated beacons such as "suggested beacons" or "others who liked this beacon also liked . . ." based on this data artificial intelligence ("AI") to learn what types of activities the user engages in, their likes, the frequency of beacon engagement, and so on. The AI engine suggests activities to the user based on their past behavior AI of the system can also learn from the activities of other users using beacon app and correlate that data as suggestions to other users with a similar profile of likes and interests the system can also suggest beacons to contribute to the general well-being of the user. At a user's request, the system can suggest beacons of activities that would help contribute to their wellness or fill an area that appears deficient. Examples of wellness activities that the system could suggest are: relationships, career development, financial education, spirituality, purpose-driven activities, mindset, and other core aspects of life tied to happiness and well-being Pending beacons will be limited in how far ahead in time the event can be advertised. If users want the pending notification to be displayed further ahead in time, they can pay for a commercial beacon, which will have a longer time range.

Beacons can be placed at a fixed physical location like a brick-and-mortar business, or the place that a user parked, but they can also be placed on mobile items. Mobile beacons could be placed on a user to show their current position and could also be used to show ETA times to various locations.

Beacon customizations will be offered to businesses as ways to make their listings more appealing and visible. These can be animations or effects like fireworks, a spinning ring, or a cube rolling then going through the building, and so on. These different effects will have pricing reflecting but not limited to duration, style, size, viewable distance etc.

- To help differentiate between Beacon types, a unique sound could be played for each category when a user views a Beacon or comes near one. For greater clarity, a unique sound could be played as a user walks by a Beacon to alert the user of its presence
- To help differentiate between Beacon types, a unique vibration or haptic signal could be played for each category when a user views a Beacon or comes near one. For greater clarity, a unique vibration could be played as a user walks by a Beacon to alert the user of its presence
- D can prescribe specific beacons to their patients by creating the beacon and sending it directly to them. In such cases, the beacon can be created with a "compliance feedback" tag, where the doctor is notified and can historically see if/when a user engages with the prescribed beacon. Doctors can also share beacons with their fellow colleagues, who can also prescribe the same beacons to their patients. In this way, beacons become analogous to certain drugs, for example, that are proven to work on certain types of patients and that information is shared among medical professionals
- Enhanced Beacons can also be created for a fee, in the app Enhanced visualizations, a longer time of existence, a greater viewable distance, and other enhancements can be added to a Beacon for an extra charge. These "enhanced" Beacons form a source of revenue for various innovative embodiments disclosed herein.
- The duration that a Beacon can remain visible can be changed by the user to be shorter than the default, at any time. The duration can be extended longer than the standard time for a fee. "Permanent Beacons" are also possible to create for a recurring fee (e.g. a MacDonald's restaurant).
- Sponsored event Beacons will be used as a method for businesses/beacon hosts to promote their event.
- differentiate your beacon from those around you, additional effects may be purchased (with a local or in-app currency). These effects could include changing the color of your beacon, adding animations to the top (fireworks, sparkles, strobe light, etc.), adding a video or gif to the top of your beacon, directing users with an on-screen pointing device (arrow, finger, enclosing circle etc.), range that your beacon can be detected at, auditory feedback, animated star ratings being displayed etc.
- Different genres of events would have a common differentiator on them (different colors for different genres, different heights, different icons, etc.). These would be standardized to prevent user confusion
- Featured Beacons could be purchased and presented to users in a prioritized manner. The highest-ranking Beacons relating to user preferences, search relevance, and overall rating could be presented as a 'top N featured options'
- Where beacon app could place a higher ranking on locally managed small businesses. The closer the event/location is to the user, the higher its priority would be
- To ensure that a sponsored beacon is legitimate, beacon app will utilize a variety of verification methods. Some elements that could be used for verification are: GPS location cross referenced with known location data, Frequency of beacon placements, Rating of beacon host, peer/local user ratings, VPN Detection/Tracking, and any other verification method that will become known in the future
- Beacons that require a specific age to enter will only be presented to user's who are known to meet that age restriction
- Beacon hosts will be able to promote their beacon through payment. There will be a variety of payment options that will include but are not limited to: paying a specific amount with a local or in app currency, purchasing a bundle/bulk pack of sponsored Beacons with a local or in app currency, pre-purchasing a specific value worth of advertising to last for a predetermined time (ex. $10/day, week, month, year etc.) with a local or in-app currency, etc.
- overcoming occlusion
- images from cell-tower-mounted cameras
- would tap into the camera signals nearest the user and stitch together images from these cameras to give an elevated view from above the user's actual location: the user could effectively view their surroundings from a higher elevation directly above them
- distance from the user's location and each cell tower would be calculated and the images from the cameras combined in such a way that the view provided in beacon app is interpolated to be directly at the user's location
- real-time live view of their surroundings. This type of real-time imagery would help the user view beacons near them with minimal occlusion
- Satellite imagery
- provided by Google and others via APIs—provide the user with an elevated view of their surroundings
- view would move with the user—as they move and/or change the direction they are facing. The user would view by holding up their phone and looking around, the same way as they would normally while looking through the phone of the camera (see example)
- 3D view in maps—map software also have 3D views that could be exploited in the same way satellite view could be as described above (see example)
- Street View
- When the view to the destination beacon is occluded in the street view, beacon app could morph the image into either the satellite view or the 3D map's view
- user could specify at what elevation they wanted to view the scene
- privacy
- encryption, protected storage, biosecurity, passcodes, and a myriad of other techniques
- One user cannot place a Beacon on another user or person to track them. Biometric verification is required to place a mobile Beacon and can only be associated with the mobile device that created the Beacon
- safety
- encryption, protected storage, biosecurity, passcodes, and a myriad of other techniques rating/reporting
- Users of the system can choose to rate their interactions with service providers or other users of the system, effecting a partially or entirely self-regulating user environment.
- allowing reviews, positive or negative
- users of the system can report violations of system rules and/or local law (e.g., false representation, false advertising, discrimination, etc.)—more serious rule-enforcement tool than mere negative review
- system may provide warning Beacons associated with events/locations that have been reported as violating beacon app rules, being a safety risk, breaking local laws, and other serious violations Users may implement a personal beacon, including selectively enabling others to provide rating or other feedback (e.g., that appears within the beacon)—e.g., in a gaming or closed social environment accepting system credits as payment for activities and/or beacon enhancements businesses that wish to engage with system users may accept system credits as a currency to pay for activities further to bowling alley example, a user could opt to pay for a game with the credits they have accumulated for paying to play previously. This could be used as a loyalty type program where if the user plays 4 rounds of bowling, they would receive enough credits to play a 5th for free;

business may use system credits collected from users to pay for enhanced beacons users could purchase beacon app credits to spend on in-app purchases rather than completing additional events/activities to earn the credits beacon app or third-party businesses could offer exclusive content that can only be purchased with beacon app Credits. This could be a specific graphic or skin to augment the user's experience and/or set them apart from their peers gaming beacon app could act as a platform for where third-party game manufacturers would make their creations available in the AR space. Users would be able to pull these games up on their devices and connect with their in-app network to play in real time at the same location, or across the world form partnerships with third-party game companies and/or marketplaces to offer in game credit for completing system activities. This would be a way for gamers to continue grinding for points when they are not able to be playing their game, and also promote a healthier experience platform to host first party games, surveys, articles, blog posts and so on allow for users to choose to use third party add-ons including but not limited to: games, skins that change the way assets appear, and so on. beacon app could collect a percentage of the sale for facilitating the marketplace and transaction may have its own first party health and fitness apps built-in, it may also provide API/plug-in access for third party apps to use the beacon app system, like MyFitnessPal or other third-party apps that users are already utilizing signs/billboards registered users of beacon app may leave hyper-localized messages or "signs" as augmented reality posters at specific locations for people in their contacts list friend could leave a "happy birthday" sign on the front lawn of one of their friends. The friend would receive a beacon app notification to indicate a beacon app Sign was left for them. This notification could be delivered in a myriad of ways, including a text message, an email, a notification within the beacon app, a system notification, and more. In a preferred embodiment, the notification could take place when the Sign recipient becomes physically near the Sign leave loved-ones messages scheduled far into the future and at specific locations. For example, at the location of a first date, a past residence, or even a memorial marker after someone passes away loved ones could visit a memorial of someone who has passed away and receive a beacon app Sign specifically meant for them sent by the person who deceased Sign could be placed virtually using a map feature in the beacon app, or it could be placed "physically" by the sender actually being physically located at the location where the beacon app Sign is placed Signs could be permanent or temporal. For example, a "Happy Birthday" Sign could be set to last only for the 24 hours of the birth day. Signs can also be scheduled in the future. So, the Happy Birthday Sign could be recurring every year, for example Signs could be scheduled into the future based on a set of criteria, such as date/time, location, preferences set by the recipient, and other events recipient will see the sign as if it is actually physically present in the location Sign could be left by a parent for a child on their way to school at the front door of their house, on their bathroom minor, and so on. In this application, they could be thought of as virtual "sticky notes"

Users of the app could leave beacon app Signs for friends in their contacts list that don't already have the app installed. The recipient would get a text message or other form of notification informing them they have a Sign and need to install the beacon app in order to view the Sign. A link to the app store download page would be provided in the message so with one tap, the recipient can download the app and begin using it virtual billboards would exist in a stationary location just like physical billboards, but the message and who can see the message can be changed dynamically advertisers could customize the message on the billboard according to likes, dislikes, and behavior patterns of beacon app users. For example, the same physical billboard could display a different advertisement for iPhone users and Android smartphone users AR Billboards could also be used for personalized messaging. For example, beacon app billboards could be used to deliver real world messages to friends and family on their commute, such as "have a great day!". Or could be used for scavenger hunt games. Or used for directions with messages like "you're heading in the right direction non-AR interface can display "beacons" using traditional map views, for example can also be used to alert beacon app users when there is a billboard, sign, or beacon near them that they can view in the system Community Beacons" that beacon app as well as users can launch as an effort to find volunteers Community Beacon" could be a service project. This could be as basic as litter collection or as elaborate as a bottle drive. Volunteers could be rewarded with beacon app service credits for these events businesses and events could offer discounts for people who have service credits obtained through volunteering. For example, a music concert could offer backstage passes to anyone with service credits above a certain level rewarding beacon app credits for Community Service, users could perform multiple volunteer activities then use those credits to purchase food, goods, or services from businesses, shelters, and organizations that accept beacon app Credits partner will larger companies looking to help out with homelessness and/or other community projects to provide extra rewards for volunteers. An example could be partnering with Coca Cola, who already marks their cans with QR codes, to provide beacon app Credit for recycling Coca Cola cans and bottles monetization examples
    sponsored beacons—Beacons for paid events
        Users who view sponsored Beacons could also purchase a ticket to the event it is advertising. The beacon app may collect a negotiated commission from the event organizer for users who view a sponsored Beacon and use it to purchase a ticket (or other authorization) to attend the event
        Event coordinators may pay extra to extend the range of their "beacon", change its size and color, and even add additional visual effects such as fireworks, as previously described in this document
        may charge a base fee plus a stipend for each interaction with the Beacon and potentially a percentage of the resulting sale
        cost of advertising in physical space is more expensive than online such as with a Facebook ad. Sponsored beacons are a hybrid of these two approaches
        charge more for a proximity ad because the user's will be physically closer to the place of business and more likely to be a customer. At the same time, sponsored beacons will likely cost less than physical ads because of the lack of physical real estate the ad will be taking up and the easy customizations without wasting materials like signage
    targeted demographic selection
        Targeted ads will have different categories including but not limited to age, gender, interests, frequented beacons, location, previous purchases, and more
        run multiple sponsored beacons on their business storefront with each being visible only to those that fit their targeted demographic
    interactive ads
        Sponsored ads can have an additional layer to them including but not limited to: A branded mini game that users can play while near business locations, puzzles that unlock deals, Easter egg/Scavenger hunts inside the business, re-skinning a business store front with different styles etc.
        interactive ad will have an identifying marker on their beacon/storefront letting users know that there is something to engage in at that location
        multiple markers for different types of Interactive ads. For example, a "mini game" ad would have its own marker and a "base sponsored" ad would have a different one
Anchoring AR Geo-markers (Location and Direction/Orientation)
    Anchoring AR geo-markers using street-view images from OS manufacturers
    Anchoring AR geo-markers using crowd-sourced images (side-walk view)
    Anchoring AR geo-markers indoors by scanning the scene
    Anchoring AR geo-markers by taking a photograph when the beacon is placed and storing as street-view data
    Anchoring the AR Geo-markers by asking the user to face north, south, east, and/or west during a calibration procedure
    Using one or more methods to determine user orientation when street-view data is not available, including landmark recognition, shadow detection, sun location, and/or manual input from the user.
Environment Detection
    Skyline Detection
    Occlusion detection (buildings, vehicles, plants, trees, people)
Monetization
    Limiting the distance of AR geo-markers
    Limiting the display time of AR geo-markers
    Providing a way to extend the viewable distance and display time of AR Geo-markers through payment
Beacon Types
    AI algorithm that determines most-likely AR geo-markers to display to a user
    Public AR Geo-markers
    Private AR Geo-markers
One or many friends, or self
    Placing ARGM's with a message for yourself that persists
    Placing ARGM's with a message for others that persists
Data Collection
    Crowd-sourced images (to augment street view)
    Collecting geo data with demographic meta tags
Platform
    SDK that allows other apps to embed the beacon app (also referred to herein as PROXDR) experience within a third-party app. (Similar to how maps can be embedded)
    Cloud-based vs. Local (downloading the bundle in cases where internet is not available, but GPS is available)

In the foregoing description and in the accompanying drawings, specific terminology and drawing symbols have been set forth to provide a thorough understanding of the disclosed embodiments. In some instances, the terminology and symbols may imply details not required to practice those embodiments. For example, any of the specific mobile device/system types, methods of determining position/orientation, filtering categories, use cases, disposition of processing operations (e.g., within cloud compute engine vs. locally within user's mobile device/apparatus), beacon shapes/sizes/characteristics, paid beacon enhancements, default beacon characteristics, user-profile information, achievement features, rendering algorithms (e.g., grid overlay), and so forth can be different from those described above in alternative embodiments. Signal paths depicted or described as individual signal lines may instead be implemented by multi-conductor signal buses and/or wireless media. The term "coupled" is used herein to express a direct connection as well as a connection through one or more intervening functional components or structures. Programming of operational parameters may be achieved, for example and without limitation, by loading one or more control values into a memory (including a register or other storage circuit) within above-described client-side and cloud-compute devices in response to a host instruction (and thus controlling an operational aspect of the device and/or establishing a device configuration) or through a one-time programming operation. The terms "exemplary" and "embodiment" are used to express an example, not a preference or requirement. Also, the terms "may" and "can" are used interchangeably to denote optional (permissible) subject matter. The absence of either term should not be construed as meaning that a given feature or technique is required.

Various modifications and changes can be made to the embodiments presented herein without departing from the broader spirit and scope of the disclosure. For example, features or aspects of any of the embodiments can be applied in combination with any other of the embodiments or in place of counterpart features or aspects thereof. Accordingly, the specification and drawings are to be regarded in an illustrative rather than a restrictive sense.

What is claimed is:

1. A method of operation within a mobile computing device having a camera, global-positioning-system (GPS) module, touch-sensitive display and wireless communications interface, the method comprising:
    transmitting GPS coordinates of the mobile computing device, obtained via the GPS module, to a remote compute engine via the wireless communications interface;
    receiving, from the remote compute engine via the wireless communication interface, information generated at least in part by artificial intelligence (AI) specifying GPS coordinates of one or more points of potential interest to a user of the mobile computing device; and
    rendering, onto the touch-sensitive display:
        a live video stream generated by the camera corresponding to an objective scene within a temporally shifting field of view of the camera and having overlaid thereon, as if part of the objective scene, one or more mixed-reality markers at locations on the touch-sensitive display corresponding to the GPS coordinates of the one or more points of potential interest such that the one or more mixed-reality markers graphically depict geographic locations of the one or more points of potential interest within the live video stream;
        supplemental information regarding a first one of the one or more points of potential interest in response to the user of the mobile computing device tapping a corresponding first one of the one or more mixed-reality markers on the touch-sensitive display;
    wherein rendering the live video stream corresponding to the objective scene within the temporally shifting field of view of the camera and having the one or more mixed-reality markers overlaid thereon at locations on the touch-sensitive display corresponding to the GPS coordinates of the one or more points of points of potential interest comprises rendering more physically distant ones of the one or more mixed-reality markers onto the touch-sensitive display at vertically higher positions within the objective scene than less physically distant ones of the one or more mixed-reality markers; and
    wherein rendering onto the touch-sensitive display the live video stream corresponding to the objective scene within the temporally shifting field of view of the camera and having the one or more mixed-reality markers overlaid thereon at locations on the touch-sensitive display corresponding to the GPS coordinates of the one or more points of points of potential interest further comprises rendering the more physically distant ones of the one or more mixed-reality markers onto the touch-sensitive display in smaller scale than less physically distant ones of the one or more mixed-reality markers to convey their greater physical distance from the mobile computing device.

2. The method of claim 1 wherein:
    as the user re-orients the mobile computing device, shifting the camera's field of view such that features within the live video stream corresponding to the one or more points of potential interest move within the touch-sensitive display, the one or more mixed-reality markers move within the touch-sensitive display together with the features such that the one or more mixed-reality markers appear to be anchored to the one or more points of potential interest, respectively;
    upon shifting the camera's field of view such that one of the one or more points of potential interest, corresponding one-for-one with one of the features, falls outside the camera's field of view, the mobile computing device ceases to render the one of the features and corresponding one of the mixed-reality markers on the touch-sensitive display; and
    upon reversing direction of shifting the camera's field of view such that the one of the potential points of interest reappears within the camera's field of view, the mobile computing device reverts to rendering the one of the features and corresponding one of the mixed-reality markers on the touch-sensitive display.

3. The method of claim 1 wherein receiving the information specifying GPS coordinates of the one or more points of potential interest comprises receiving information specifying GPS coordinates of multiple points of potential interest, and wherein rendering the live video stream having the one or more mixed-reality markers overlaid thereon comprises:
    determining an orientation of the camera;
    identifying, based at least in part on the orientation of the camera and the GPS coordinates of the multiple points of potential interest, a subset of the multiple points of potential interest, fewer than all the multiple points of potential interest, that fall within the field of view of the camera at a given instant; and
    rendering the one or more mixed-reality markers at locations on the touch-sensitive display corresponding to the GPS coordinates of the subset of the multiple points of potential interest.

4. The method of claim 3 wherein determining the orientation of the camera comprises at least one of (i) comparing one or more constituent images of the live video stream generated by the camera with street-view images stored within a database together with information indicating geographic locations associated with the street-view images, or (ii) instructing a user of the mobile computing device to move the mobile computing device so as to scan a wider view of the objective environment than constituted by an instantaneous field of view of the camera.

5. The method of claim 1 further comprising crediting one or more incentive benefits to the user of the mobile computing device in response to one or more actions of the user of the mobile computing device in association with the one or more mixed-reality markers.

6. The method of claim 1 further comprising:
    detecting, based on information from one or more sensors within the mobile computing device, transitions of the camera between forward-facing and ground-facing orientations;
    in response to detecting transition of the camera from the forward-facing orientation to the ground-facing orientation, rendering a two-dimensional map onto at least part of the touch-sensitive display instead of the live video stream, the two-dimensional map interface identifying geographic locations of the one or more points of potential interest; and
    in response to detecting transition of the camera from the ground-facing orientation to the forward-facing orientation, reverting to rendering the live video stream having the one or more mixed-reality markers overlaid thereon onto the at least part of the touch-sensitive display without rendering the two-dimensional map.

7. The method of claim 1 wherein rendering the live video stream having the one or more mixed-reality markers overlaid thereon comprises determining an orientation of the camera based on one or more of the following: measuring an angle of a shadow cast by the sun; determining a location of the sun in relation to the mobile computing device at a specified date and time; determining a location of a geographic landmark in relation to the mobile computing device; or identifying alphanumeric characters within one or more images of the live video stream and correlating the alphanumeric characters to geo-mapping information.

8. The method of claim 1 wherein receiving the information specifying GPS coordinates of the one or more points of potential interest comprises receiving descriptive/illustrative data pertaining to the one or more points of potential interest, the descriptive/illustrative data including at least one of text information or graphical icon/logo information, and wherein rendering the live video stream having the one or more mixed-reality markers overlaid thereon comprises rendering the live video stream with the descriptive/illustrative data overlaid thereon at locations within the touch-sensitive display that convey association with the one or more mixed-reality markers.

9. The method of claim 1 wherein rendering the live video stream having the one or more mixed-reality markers overlaid thereon comprises animating at least one of the one ore more mixed-reality markers to draw attention from the user of the mobile computing device.

10. The method of claim 1 wherein rendering the live video stream having the one or more mixed-reality markers overlaid thereon comprises changing an appearance of the one or more mixed-reality markers on the touch-sensitive display over time in accordance with temporally changing circumstances relating to the one or more points of potential interest.

11. The method of claim 1 wherein receiving the information specifying GPS coordinates of the one or more points of potential interest comprises receiving information specifying GPS coordinates of multiple points of potential interest, and wherein rendering the live video stream having the one or more mixed-reality markers overlaid thereon comprises:
identifying a subset, fewer than all, of the multiple points of potential interest based at least in part on pre-stored marker-filtering criteria; and
rendering the one or more mixed-reality markers at locations on the touch-sensitive display corresponding to the GPS coordinates of the subset of the multiple points of potential interest.

12. The method of claim 11 further comprising, prior to identifying the subset of the multiple points of potential interest based at least in part on the pre-stored marker-filtering criteria, rendering on the touch-sensitive display of the mobile computing device a prompt to a user of the mobile computing device to provide information indicative of the user's interest and storing that information for subsequent application as the pre-stored marker-filtering criteria.

13. The method of claim 12 wherein rendering the prompt to the user to provide information indicative of the user's interest comprises prompting the user to specify one or more categories of business service providers of interest to the user.

14. The method of claim 1 wherein rendering onto the touch-sensitive display the live video stream having the one or more mixed-reality markers overlaid thereon comprises dynamically changing the appearance of the one or more mixed-reality markers on the touch-sensitive display in response to interaction with the user of the touch-sensitive display, the interaction with the user including touch-contact with the touch-sensitive display.

15. The method of claim 1 wherein the mobile computing device is integrated within a passenger vehicle and wherein the touch-sensitive display comprises at least one heads-up display implemented within or projected on a windshield of the passenger vehicle.

16. The method of claim 1 wherein the one or more mixed-reality markers correspond to physical locations of respective real properties and display real-estate information corresponding to those real properties.

17. The method of claim 16 wherein the real-estate information displayed for at least one of the respective real properties comprises an indication that the one of the respective real properties is listed for sale by a realtor.

18. The method of claim 16 wherein the real-estate information displayed for at least one of the respective real properties comprises an indication that the one of the respective real properties is an open house and, as such, subject to visitation by prospective purchasers.

19. The method of claim 1 wherein the supplemental information rendered onto the touch-sensitive display in response to the user of the mobile computing device tapping the first one of the one or more mixed-reality markers comprises a link to a website corresponding to the corresponding first one of the one or more points of potential interest.

20. The method of claim 1 wherein rendering the live video stream having the one or more mixed-reality markers overlaid thereon comprises rendering, as at least part of a first one of the one or more mixed-reality markers, (i) a frame containing one or more symbols that convey descriptive information with respect a corresponding one of the one or more points of potential interest and (ii) a tail that extends downward from the frame toward the physical location of the corresponding one of the points of potential interest.

21. The method of claim 1 wherein rendering the live video stream corresponding to the objective scene and having the one or more mixed-reality markers overlaid thereon at locations on the touch-sensitive display corresponding to the GPS coordinates of the one or more points of points of potential interest comprises rendering the one or more mixed-reality markers onto the touch-sensitive display above the one or more points of potential interest in a skyline view, each of the one or more mixed-reality markers having (i) a frame containing one or more symbols that convey descriptive information with respect a corresponding one of the one or more points of potential interest and (ii) a tail that extends downward in the skyline view from the frame toward the physical location of the corresponding one of the points of potential interest.

22. A method of operation within an augmented-reality rendering system having a mobile computing device and a cloud compute engine coupled to one another via a wireless communications network, the method comprising:
generating, at least in part by artificial intelligence (AI) within the cloud compute engine, marker information corresponding to various points of interest and storing the marker information within a database maintained by the cloud compute engine;

transmitting, from the mobile computing device to the cloud compute engine via the wireless communications network, GPS coordinates of the mobile computing device;

transmitting, from the cloud compute engine to the mobile computing device, a subset of the marker information stored within the database and selected therefrom by the cloud compute engine based at least in part on the GPS coordinates of the mobile computing device, the subset of the marker information specifying GPS coordinates of one or more points of potential interest to a user of the mobile computing device;

rendering, onto a touch-sensitive display of the mobile computing device:
- a live video stream generated by a camera of the mobile computing device corresponding to an objective scene within a temporally shifting field of view of the camera and having overlaid thereon, as if part of the objective scene, one or more mixed-reality markers at locations on the touch-sensitive display corresponding to the GPS coordinates of the one or more points of potential interest such that the one or more mixed-reality markers graphically depict geographic locations of the one or more points of potential interest within the live video stream; and
- supplemental information regarding a first one of the one or more points of potential interest in response to the user of the mobile computing device tapping a corresponding first one of the one or more mixed-reality markers on the touch-sensitive display;

transmitting, from the mobile computing device to the cloud compute engine via the wireless communications network, analytics information indicative of actions by the user of the mobile computing device in association with at least one of the one or more mixed-reality markers or the one or more points of potential interest to which the one or more mixed-reality markers correspond;

within the cloud compute engine, aggregating the analytics information transmitted from the mobile computing device with counterpart analytics information received from other mobile computing devices to produce an analytics data set that may be accessed by individuals associated with the one or more points of potential interest respectively; and wherein the analytics information includes at least one of:
(i) how often a particular one of the one or more mixed-reality markers is viewed;
(ii) how many human viewers of the one or more mixed-reality markers, collectively including the user of the mobile computing device and users of the other mobile computing devices, engage with the one or more points of potential interest to which the one or more mixed-reality markers correspond; or
(iii) demographic information regarding the human viewers.

23. The method of claim 22 wherein the information specifying GPS coordinates of the one or more points of potential interest comprises information specifying GPS coordinates of multiple points of potential interest, and wherein rendering the live video stream having the one or more mixed-reality markers overlaid thereon comprises:
determining an orientation of the camera;
identifying, based at least in part on the orientation of the camera and the GPS coordinates of the multiple points of potential interest, a subset, fewer than all, of the multiple points of potential interest that fall within the field of view of the camera at a given instant; and
rendering the one or more mixed-reality markers at locations on the touch-sensitive display corresponding to the GPS coordinates of the subset of the multiple points of potential interest.

24. The method of claim 23 wherein determining the orientation of the camera and identifying the subset of the multiple points of potential interest comprises iteratively determining the orientation of the camera as that orientation changes over time, and iteratively identifying corresponding subsets of the multiple points of potential interest such that different subsets of the multiple points of potential interest are identified as the camera orientation changes.

25. The method of claim 23 wherein determining the orientation of the camera comprises comparing one or more constituent images of the live video stream generated by the camera with street-view images stored within a database together with information indicating geographic locations associated with the street-view images.

26. The method of claim 25 wherein the cloud compute engine constitutes a first cloud compute engine, the method further comprising obtaining the street-view images from a second cloud compute engine via the wireless communications network.

27. The method of claim 23 wherein determining the orientation of the camera comprises instructing a user of the mobile computing device to move the device so as to scan a wider view of the objective environment than constituted by an instantaneous field of view of the camera.

28. A mobile computing device comprising:
a camera;
a global-positioning-system (GPS) module;
a touch-sensitive display;
a wireless communications interface;
a processing unit; and
a memory having program code stored therein that, when executed by the processing unit, causes the processing unit to:
transmit GPS coordinates of the mobile computing device, obtained via the GPS module, to a remote compute engine via the wireless communications interface;
receive, from the remote compute engine via the wireless communication interface, information generated at least in part by artificial intelligence (AI) specifying GPS coordinates of one or more points of potential interest to a user of the mobile computing device; and
render, onto the touch-sensitive display:
a live video stream generated by the camera corresponding to an objective scene within a temporally shifting field of view of the camera and having overlaid thereon, as if part of the objective scene, one or more mixed-reality markers at locations on the touch-sensitive display corresponding to the GPS coordinates of the one or more points of potential interest such that the one or more mixed-reality markers graphically depict physical locations of the one or more points of potential interest within the live video stream;
supplemental information regarding a first one of the one or more points of potential interest in response to the user of the mobile computing device tapping a corresponding first one of the one or more mixed-reality markers on the touch-sensitive display;

wherein rendering the live video stream corresponding to the objective scene within the temporally shifting field of view of the camera and having the one or more mixed-reality markers overlaid thereon at locations on the touch-sensitive display corresponding to the GPS coordinates of the one or more points of points of potential interest comprises rendering more physically distant ones of the one or more mixed-reality markers onto the touch-sensitive display at vertically higher positions within the objective scene than less physically distant ones of the one or more mixed-reality markers; and wherein rendering onto the touch-sensitive display the live video stream corresponding to the objective scene within the temporally shifting field of view of the camera and having the one or more mixed-reality markers overlaid thereon at locations on the touch-sensitive display corresponding to the GPS coordinates of the one or more points of points of potential interest further comprises rendering the more physically distant ones of the one or more mixed-reality markers onto the touch-sensitive display in smaller scale than less physically distant ones of the one or more mixed-reality markers to convey their greater physical distance from the mobile computing device.

* * * * *